(12) United States Patent
Makino

(10) Patent No.: US 10,122,802 B2
(45) Date of Patent: Nov. 6, 2018

(54) INFORMATION PROCESSING SYSTEM, INFORMATION PROCESSING APPARATUS, IMAGE PROCESSING APPARATUS, PROCESSING METHOD OF INFORMATION PROCESSING SYSTEM, AND PROGRAM

(71) Applicant: CANON KABUSHIKI KAISHA, Tokyo (JP)

(72) Inventor: Yoichiro Makino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 494 days.

(21) Appl. No.: 14/755,505

(22) Filed: Jun. 30, 2015

(65) Prior Publication Data

US 2016/0006838 A1    Jan. 7, 2016

(30) Foreign Application Priority Data

Jul. 1, 2014   (JP) ................. 2014-136333

(51) Int. Cl.
*H04L 29/08*    (2006.01)
*H04L 29/06*    (2006.01)

(52) U.S. Cl.
CPC .............. *H04L 67/18* (2013.01); *H04L 69/14* (2013.01)

(58) Field of Classification Search
CPC ......... H04L 67/18; H04L 41/22; H04L 69/14; H04N 2201/0094; H04N 1/00225; H04N 1/00244; H04N 2201/3273; H04N 2201/3278; H04N 1/00127; H04N 1/00209; H04N 1/00217; H04N 1/00236; H04N 1/00241; H04N 1/00132; H04N 21/422; H04N 21/4312; H04N 21/47205;
(Continued)

(56) References Cited

U.S. PATENT DOCUMENTS 6,134,595 A * 10/2000 Huang ............... H04N 1/00236
                                                707/999.01
6,167,462 A * 12/2000 Davis ................. H04N 1/00236
                                                709/217
(Continued)

FOREIGN PATENT DOCUMENTS

CN      101030133 A    9/2007
CN      103220448 A    7/2013
(Continued)

*Primary Examiner* — Sargon Nano
(74) *Attorney, Agent, or Firm* — Canon U.S.A., Inc. IP Division

(57) ABSTRACT

A system includes a processing unit for performing processing, an acceptance unit for accepting an execution instruction for the processing unit made by a user, a request unit for, based on acceptance by the acceptance unit, requesting a server via a first communication path to issue a first execution instruction for the processing unit, an issuance unit for, based on acceptance by the acceptance unit, issuing a second execution instruction for the processing unit via a second communication path, a receiving unit for receiving the first execution instruction that the server has issued in response to a request from the request unit, and a transmission unit for transmitting a processing result of the processing unit to a server on the basis of the first execution instruction. The processing unit performs processing in response to either the first execution instruction or the second execution instruction, whichever arrives first.

16 Claims, 16 Drawing Sheets

(58) Field of Classification Search
CPC ......... G07B 2017/00709; G06F 3/1236; G06F 3/1292; G06F 3/1297; G06F 3/1288; G06F 3/1289; G06F 3/129
See application file for complete search history.

(56) References Cited

U.S. PATENT DOCUMENTS

| | | | | |
|---|---|---|---|---|
| 6,256,662 | B1* | 7/2001 | Lo | H04N 1/00236 709/203 |
| 7,446,892 | B1* | 11/2008 | Churchill | G06F 17/30011 358/1.15 |
| 7,619,763 | B2* | 11/2009 | Gibson | B41J 29/393 358/1.13 |
| 7,672,003 | B2* | 3/2010 | Dowling | G06F 21/606 358/1.15 |
| 8,264,711 | B2 | 9/2012 | Takahashi | |
| 8,582,579 | B2 | 11/2013 | Yousefi | |
| 8,953,202 | B2 | 2/2015 | Ishigure | |
| 9,729,736 | B2* | 8/2017 | Takahashi | H04N 1/00323 |
| 9,888,134 | B2* | 2/2018 | Sugawara | H04N 1/00212 |
| 2003/0043416 | A1* | 3/2003 | Rublee | H04N 1/00222 358/402 |
| 2009/0300109 | A1* | 12/2009 | Porter | G06F 17/30035 709/203 |
| 2013/0229673 | A1 | 9/2013 | Nakayama | |
| 2014/0025443 | A1* | 1/2014 | Onischuk | G07C 13/00 705/12 |
| 2014/0053222 | A1* | 2/2014 | Shoykher | G06F 3/017 725/110 |
| 2014/0297566 | A1* | 10/2014 | Gilham | G07B 17/00467 705/408 |
| 2014/0313531 | A1* | 10/2014 | Kojima | G06F 3/1221 358/1.13 |
| 2015/0055182 | A1* | 2/2015 | Parks | G06F 3/1204 358/1.15 |
| 2015/0081845 | A1* | 3/2015 | Arai | G06F 3/1204 709/218 |
| 2016/0255218 | A1* | 9/2016 | Takahashi | H04N 1/00323 358/1.15 |
| 2016/0316078 | A1* | 10/2016 | Sugawara | H04N 1/00212 |
| 2017/0295294 | A1* | 10/2017 | Takahashi | H04W 76/10 |

FOREIGN PATENT DOCUMENTS

| | | |
|---|---|---|
| JP | 2004259070 A | 9/2004 |
| JP | 2009098903 A | 5/2009 |
| JP | 2010130662 A | 6/2010 |
| JP | 04814653 B2 | 11/2011 |
| JP | 2013-149254 A | 8/2013 |

* cited by examiner

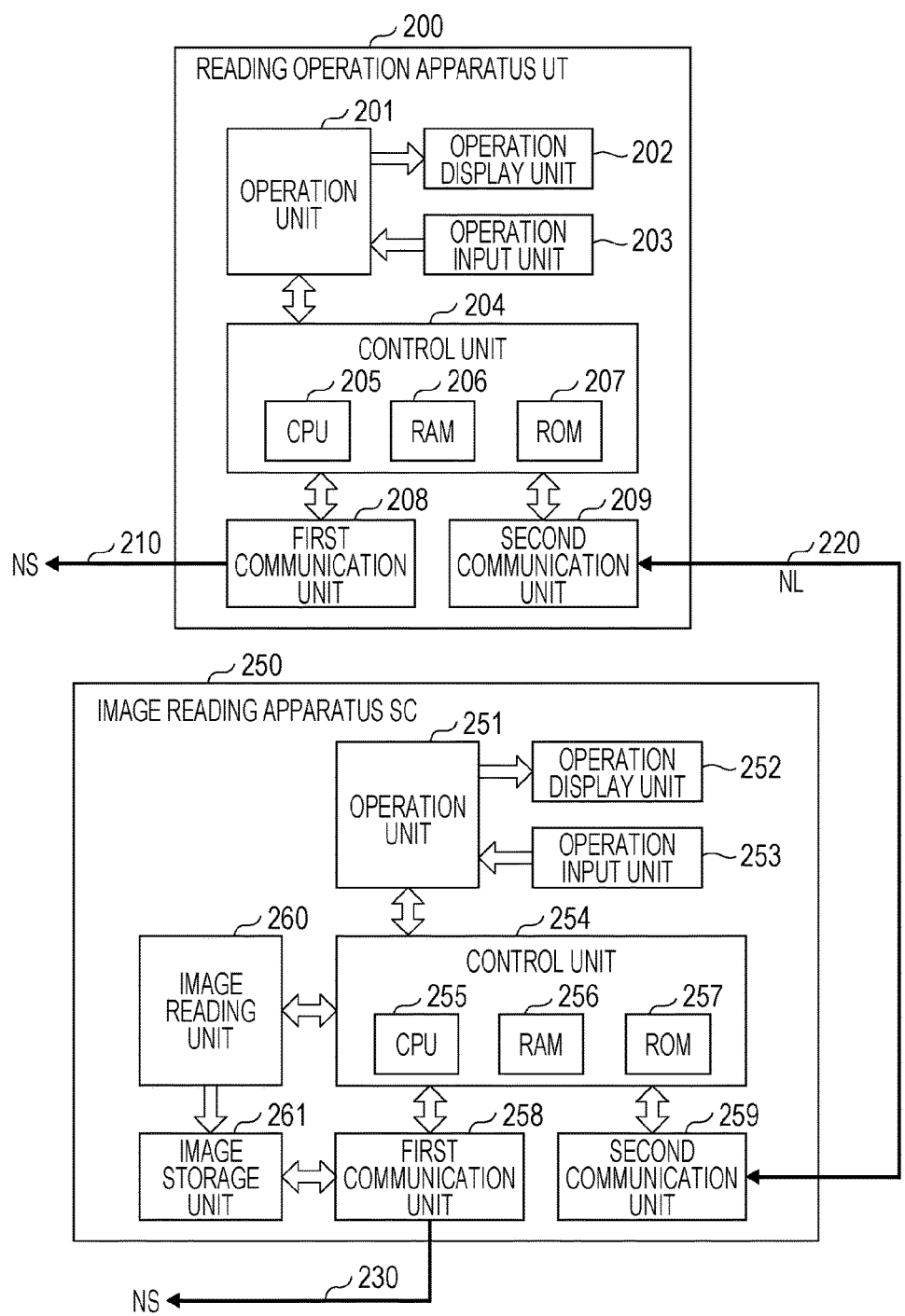

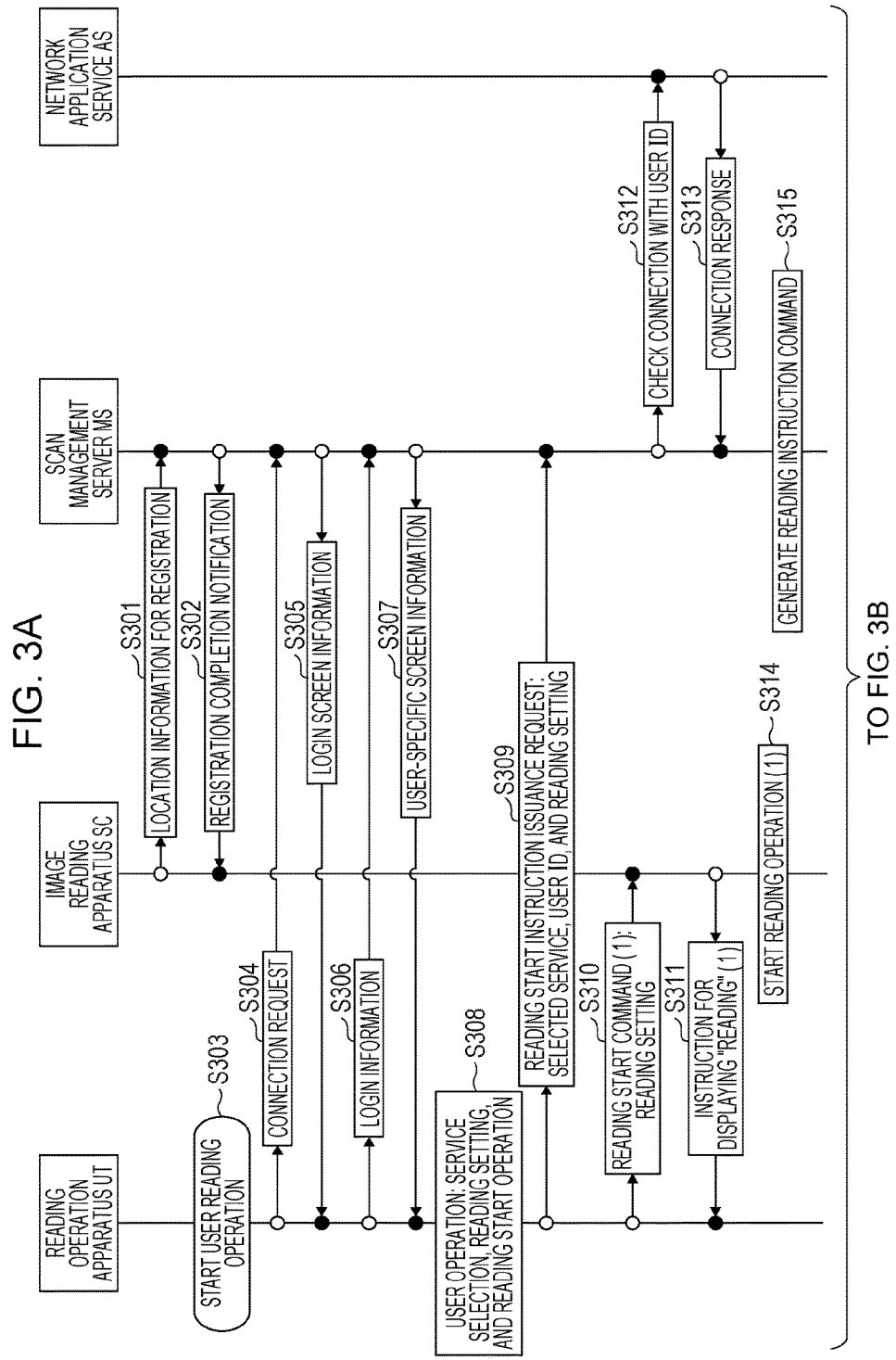

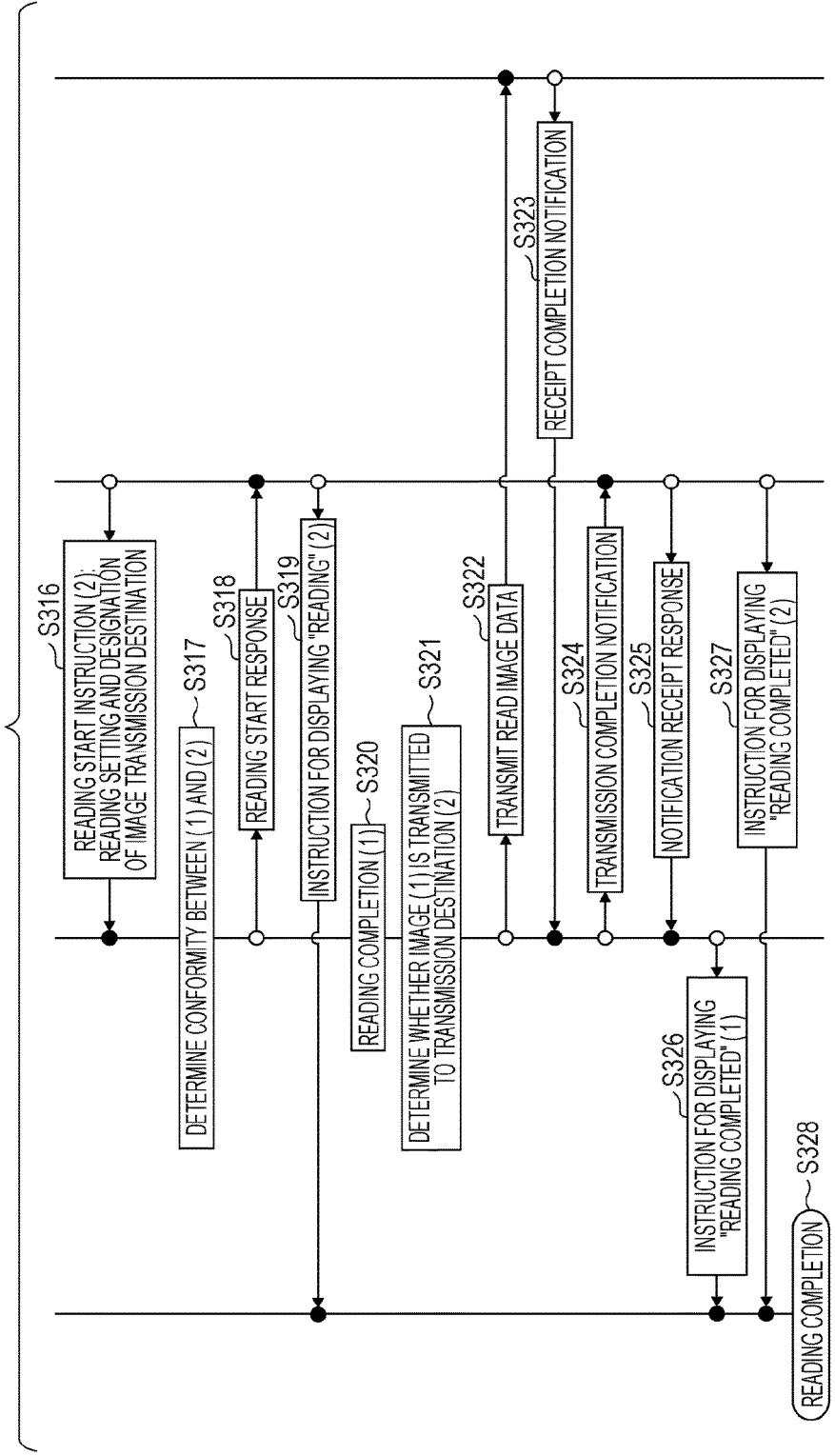

FIG. 7

TABLE 3

| DB INDEX | 000xxxxx |
|---|---|
| REGISTERED APPARATUS | SC_MODEL_XXX |
| APPARATUS-SPECIFIC INFORMATION | AA:BB:CC:DD:EE:FF |
| APPARATUS LOCATION INFORMATION | xxx.xxx.xxx.xxx |
| APPARATUS LOCATION UPDATE DATE AND TIME | 04/01/20xx 10:30:25 |
| LOGIN STATE | 0 or 1 |
| THE LAST ACCESS DATE AND TIME | 04/01/20xx 16:12:34 |
| NUMBER OF REGISTERED SERVICES | 3 |
| REGISTERED TYPE OF FIRST SERVICE | CCC CLOUD |
| REGISTERED ID OF FIRST SERVICE | user user |
| REGISTERED PW OF FIRST SERVICE | XXXX$XXXX |
| REGISTERED TYPE OF SECOND SERVICE | FFFF BOOK |
| REGISTERED ID OF SECOND SERVICE | Name name |
| REGISTERED PW OF SECOND SERVICE | XXX&XXXXXX |
| REGISTERED TYPE OF THIRD SERVICE | BBB SHARE |
| ... | ... |

TABLE 1

| USER ID | USER PW | DB INDEX |
|---|---|---|
| 0001 | XXXXX$XXXX | 00000001 |
| A-USER | XXXX$XXXXX | 000xxxxx |
| Bbbbb | XXXXXX$XX | 000zzzzz |
| ... | ... | ... |

TABLE 2

| APPARATUS-SPECIFIC INFORMATION | DB INDEX |
|---|---|
| 00:11:22:33:44:55 | 00000001 |
| ::::: | ...... |
| AA:BB:CC:DD:EE:FF | 000xxxxx |
| BB:BB:BB:BB:BB:BB | 000zzzzz |
| ::::: | ...... |

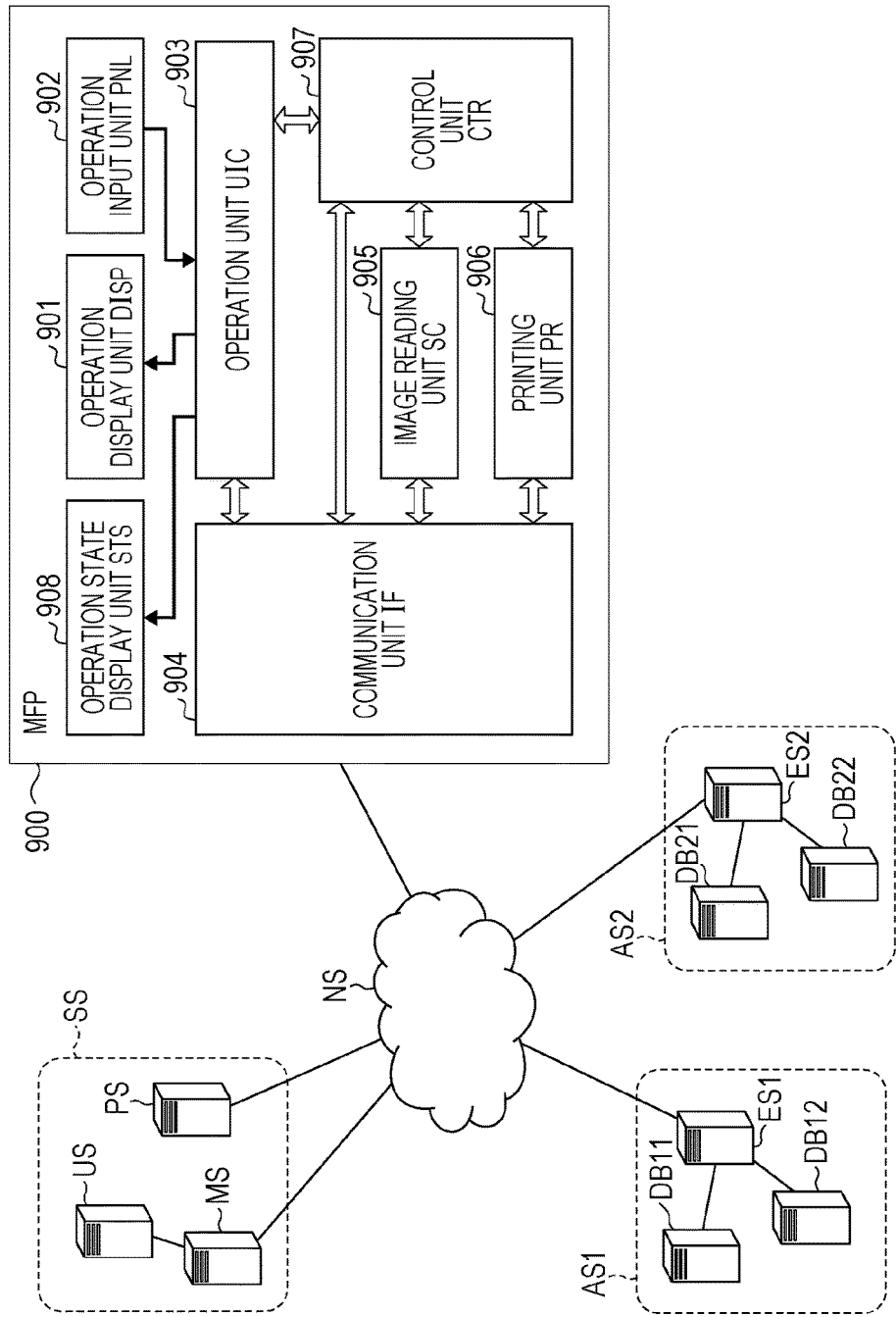

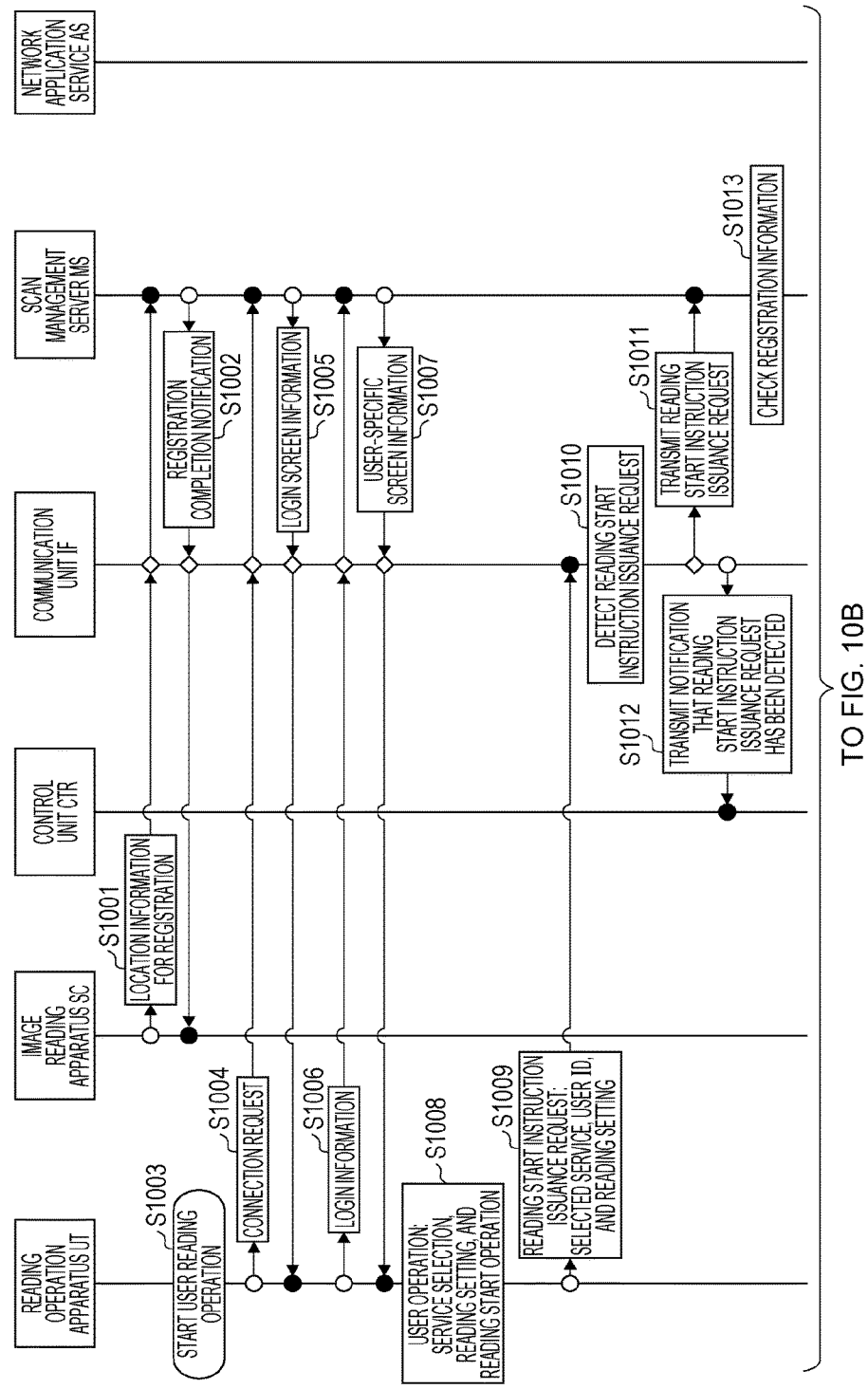

FROM FIG. 10A

INFORMATION PROCESSING SYSTEM, INFORMATION PROCESSING APPARATUS, IMAGE PROCESSING APPARATUS, PROCESSING METHOD OF INFORMATION PROCESSING SYSTEM, AND PROGRAM

BACKGROUND OF THE INVENTION

Field of the Invention

The present invention relates to information processing performed between interconnected apparatuses, and, more particularly, to an information processing apparatus connected to an external apparatus via a network, an information processing method, an information processing system, and a program.

Description of the Related Art

In recent years, apparatuses connected to each other via a network have been able to transmit and receive a massive amount of data between each other with a high-speed communication system. For example, various services in which image data is stored in an image storage server apparatus and the stored image data is used as an image are available. For example, image data read by a reading apparatus such as an image scanner or a Multi Functional Peripheral/Printer (MFP) is uploaded to a storage server apparatus connected to the reading apparatus via a network. The uploaded image data can be used for service provided by an application server apparatus on the network.

In Japanese Patent Laid-Open No. 2013-149254, an operation input device acquires various pieces of user operation information including a document reading condition from an operation information server apparatus and transmits a result of a user operation determined on the basis of these pieces of user operation information and a reading start instruction issuance request to the operation information server apparatus. Upon receiving the result of a user operation and the reading start instruction issuance request, the operation information server apparatus issues a document reading start instruction to a reading apparatus associated with a user along with the reading condition and information about an image data upload destination. With this configuration, a user can simply read a document image and upload the document image to an image storage server apparatus using not only an operation input device included in a reading apparatus but also an operation terminal apparatus connected to a network.

However, in Japanese Patent Laid-Open No. 2013-149254, after a user has made a reading start instruction, reading start information is transmitted to a predetermined image reading apparatus via the operation information server apparatus. Between the operation of the user and the operation of the image reading apparatus, processing in the operation information server apparatus and communication with the operation information server apparatus take time. Even if job processing is started by a user operation in cloud service, it is difficult for the user to recognize that the image reading apparatus will operate soon because the conditions of the image reading apparatus do not change.

SUMMARY OF THE INVENTION

An aspect of the present invention provides a print control apparatus and a print control method which are capable of solving these difficulties. Another aspect of the present invention provides an information processing system, an information processing apparatus, an image processing apparatus, a processing method for an information processing system, and a program with which a period from a time at which a user makes a processing start instruction to a time at which a processing apparatus starts to operate can be shortened.

A system according to an embodiment of the present invention includes a processing unit configured to perform processing, an acceptance unit configured to accept an execution instruction for the processing unit made by a user, a request unit configured to, based on acceptance by the acceptance unit, request a server via a first communication path to issue a first execution instruction for the processing unit, an issuance unit configured to, based on acceptance by the acceptance unit, issue a second execution instruction for the processing unit via a second communication path different from the first communication path, a receiving unit configured to receive the first execution instruction that the server has issued in response to a request from the request unit, and a transmission unit configured to transmit a processing result of the processing unit to a server on the basis of the first execution instruction received by the receiving unit. The processing unit performs processing in response to either the first execution instruction received by the receiving unit or the second execution instruction issued by the issuance unit, whichever arrives first.

Further features of the present invention will become apparent from the following description of exemplary embodiments with reference to the attached drawings.

BRIEF DESCRIPTION OF THE DRAWINGS

FIG. 2 is a block diagram illustrating the configurations of a reading operation apparatus according to the first embodiment and an image reading apparatus according to the first embodiment and the connection between them.

FIGS. 3A and 3B are sequence diagrams describing an image reading process in an image information processing network system according to the first embodiment.

FIG. 7 is a diagram describing a user information management method performed by a scan management server apparatus according to the first embodiment.

FIG. 9 is a diagram illustrating the configuration of an image information processing apparatus according to a second embodiment of the present invention including a Multi Functional Peripheral/Printer (MFP).

FIGS. 10A and 10B are sequence diagrams describing an image reading process in an image information processing apparatus according to the second embodiment including an MFP.

DESCRIPTION OF THE EMBODIMENTS

Embodiments of the present invention will be described in detail below.

First Embodiment

Figure 1:
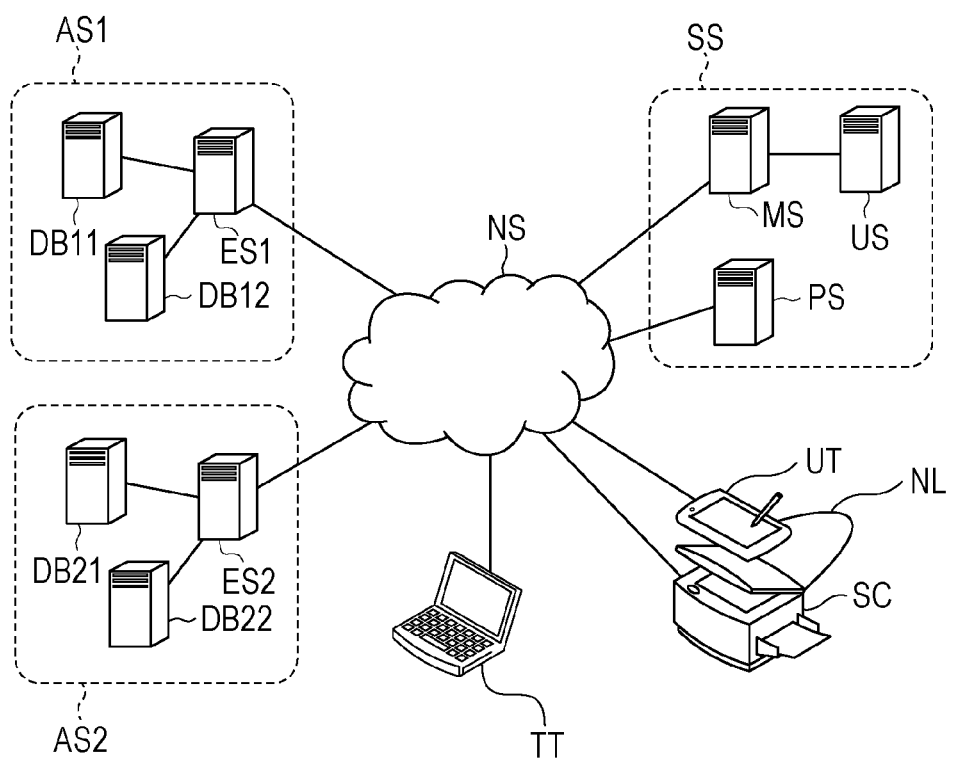
FIG. 1 is a diagram illustrating the configuration of a network system according to a first embodiment of the present invention.

FIG. 1 is a diagram describing the configuration of an image information processing network system N according to the first embodiment.

The image information processing network system N illustrated in FIG. 1 includes an image reading apparatus SC, network scan service SS, network application service AS1, network application service AS2, a reading operation apparatus UT, and an information processing apparatus TT. They can communicate with one another via a network NS. The network scan service SS is configured with a server apparatus for providing service and includes a scan management server MS, a scan image processing server PS, and an operation information server apparatus US. The scan image processing server PS processes a scan image as appropriate. The network scan service SS is not particularly limited and is provided by, for example, a manufacturer CS of the image reading apparatus SC and the reading operation apparatus UT.

Information about a user who uses image reading service and network scan service operation information to be transmitted to the image reading apparatus SC or the reading operation apparatus UT are stored in, for example, a storage unit in the scan management server MS or the operation information server apparatus US. These pieces of information may be stored in any one of the apparatuses included in the network scan service SS. In the user information, a user who uses the image reading service and the image reading apparatus SC are associated with each other and managed. That is, each user is associated with corresponding one of the image reading apparatuses SC and managed. The operation information server apparatus US is provided in addition to the scan management server MS in this embodiment, but may not be provided. The user information and service operation information are transmitted to various apparatuses via the network NS. The scan management server MS transmits a Web page via the network NS in response to a request from the Web browser of the reading operation apparatus UT, and receives from the Web browser of the reading operation apparatus UT a request for execution of processing for an image reading apparatus 250.

The network application service AS1 includes an external server ES1 and storage servers DB11 and DB12 for storing image data, and is provided by, for example, an organization C1 different from the manufacturer of the image reading apparatus SC.

The network application service AS2 includes an external server ES2 and storage servers DB21 and DB22 for storing image data, and is provided by, for example, an organization C2 different from the manufacturer of the image reading apparatus SC and the organization C1 that is the provider of the network application service AS1.

The external servers ES1 and ES2 are server apparatuses managed by organizations that provide service via a network and are used to store received image data and provide service regarding images.

Each network application service (AS1 or AS2) may include a storage unit for storing an image. For example, each network application service may one or more storage server or the external server (ES1 or ES2) itself may include a storage unit.

The reading operation apparatus UT receives a result of selection of network application service input into a user operation input unit and a document reading start instruction and transmits reading setting information and a reading start instruction to the image reading apparatus SC via the scan management server MS.

In response to the reading start instruction, the image reading apparatus SC reads a document and transmits the image data of the read document to network application service selected by a user via the network NS.

The information processing apparatus TT can use service provided by the network application service AS1 or AS2. More specifically, the information processing apparatus TT is connected to the external server ES1 or ES2 via the network NS and uses image information data stored in the network application service AS1 or AS2 or information data into which the network application service AS1 or AS2 has converted image data.

The configurations of the reading operation apparatus UT and the image reading apparatus SC will be described with reference to FIG. 2. FIG. 2 is a block diagram illustrating the configurations of the reading operation apparatus UT and the image reading apparatus SC and the connection between them.

As illustrated in FIG. 2, the reading operation apparatus UT (200) includes an operation unit 201, an operation display unit 202, an operation input unit 203, a first communication unit 208, a second communication unit 209, and a control unit 204.

The first communication unit 208 is connected to the network NS via a communication path 210. The second communication unit 209 is connected to the image reading apparatus SC (250) via a communication path NL (220) that is different from the communication path 210.

The control unit 204 performs various pieces of control computation processing and includes an central processing unit (CPU) 205 for performing overall control of the reading operation apparatus UT, a Read-Only Memory (ROM) 207 that stores a control process to be described later with reference to FIG. 4, and a Random Access Memory (RAM) 206 used for control computation processing. The ROM 207 stores various control programs executed by the CPU 205 and fixed data. The RAM 206 is used as a work area where the CPU 205 performs various pieces of computation processing and control processing.

The control unit 204 causes the first communication unit 208 to acquire operation information data of each user from the operation information server apparatus US via the network NS and displays the operation information data on an operation display unit 202. The displayed operation information data includes the network application service (AS1 or AS2) available for a user.

The operation display unit 202 displays reading conditions such as document reading quality and a document reading size and operation information such as network application service to which image data is to be transmitted. The operation display unit 202 according to this embodiment is, for example, a network client, and can download a predetermined file of operation screen data (a Web page of an HTML file) via the network NS and display it. In this embodiment, there is a function of displaying operation screen data, performing the selection and setting of the function of the image reading apparatus 250 with the operation screen data, and transmitting results of the selection and the setting to the scan management server MS. The reading operation apparatus UT requests the scan management server MS for operation screen data. The operation display unit 202 also has a function of notifying a user of predetermined information such as a reading result. The operation input unit 203 allows a user to make an instruction regarding, for example, a reading operation.

The image reading apparatus SC (250) includes an operation unit 251, an operation display unit 252, an operation input unit 253, a first communication unit 258, a second communication unit 259, a control unit 254, an image reading unit 260, and an image storage unit 261.

The first communication unit 258 is connected to the network NS via a communication path 230. The second communication unit 259 is connected to the reading operation apparatus UT (200) via the communication path NL (220) that is different from the communication path 230.

The control unit 254 performs various pieces of control computation processing and includes an central processing unit (CPU) 255 for performing overall control of the image reading apparatus SC, a Read-Only Memory (ROM) 257 that stores a control process to be described later with reference to FIG. 5, and a Random Access Memory (RAM) 256 used for control computation processing. The ROM 257 stores various control programs executed by the CPU 255 and fixed data. The RAM 256 is used as a work area where the CPU 255 performs various pieces of computation processing and control processing.

The image reading unit 260 reads a document and generates image data. The image storage unit 261 stores the image data generated by the image reading unit 260.

The operation display unit 252 displays the operation condition of the image reading apparatus 250, and also has a function of notifying a user of another piece of information. The operation input unit 253 allows a user to make an instruction regarding, for example, a reading operation.

In this embodiment, the operation unit 251, the operation display unit 252, and the operation input unit 253 are provided. However, instead of them, a button for turning on or off the power and a lamp for displaying the operational status of an apparatus may be provided.

A user operates the operation input unit 203 on the basis of operation information displayed on the operation display unit 202, performs the selection of reading conditions such as document reading quality and a document reading size and network application service to which image data is transmitted, and makes a reading start instruction. Upon receiving the reading start instruction input via the operation input unit 203, the control unit 204 causes the first communication unit 208 to transmits reading information to the scan management server MS via the network NS. The reading information is used to specify the reading conditions and the network application service to which the image data is to be transmitted, which have been input by the user with the operation input unit 203, and the user.

The reading operation apparatus UT (200) causes the first communication unit 208 to make a reading start instruction and causes the second communication unit 209 to transmit the reading condition and a reading instruction to the image reading apparatus SC via the communication path NL (220).

Upon receiving reading start information from the reading operation apparatus UT via the network NS, the scan management server MS transmits reading setting information, information about a server to which an image is to be transmitted, and a document reading start instruction to the image reading apparatus SC associated with the user. Because of the transmission delay of the network NS and a processing time taken by the scan management server MS, a delay occurs between a time at which the user operates the reading operation apparatus UT and a time at which the image reading apparatus SC receives the document reading start instruction.

The image reading apparatus SC according to this embodiment starts a reading operation in response to either the reading start instruction transmitted from the reading operation apparatus UT via the communication path NL or the reading start instruction transmitted from the reading operation apparatus UT via the scan management server MS, whichever arrives first.

When the first communication unit 258 or the second communication unit 259 receives the reading start instruction, the control unit 254 causes the image reading unit 260 to read a document image, generate image data (digital image data), and temporarily stores the image data in the image storage unit 261. The control unit 254 receives information about an image data transmission destination from the scan management server MS via the first communication unit 258. The information indicates the location of an image data transmission destination (the network application service AS). Subsequently, the control unit 254 reads the image data from the image storage unit 261 and causes the first communication unit 258 to transmit the image data to a target server via the network NS.

The scan management server MS receives the results of selection of the reading condition and the network application service from the reading operation apparatus UT via the network NS and generates reading setting to be transmitted to the image reading apparatus SC on the basis of the received selection results. In a case where the image data acquired by the image reading apparatus SC needs to be subjected to image processing before being transmitted to the network application service, the scan image processing server PS is designated as a transmission destination server, the network application service AS1 or AS2 is designated as a final storage destination, and they are added to the reading setting.

The process of reading a document image in the image reading apparatus SC and transmitting acquired image data to the network application service AS in the image information processing network system N will be described in detail with reference to FIGS. 3 to 6.

FIG. 3 is a sequence diagram describing an image reading process in the image information processing network system N. Referring to the drawing, pieces of information transmitted among the reading operation apparatus UT, the image reading apparatus SC, the scan management server MS, and the network application service AS for storing image data are illustrated. In the sequence diagram illustrated in FIG. 3, each white circle represents a transmission source of information or an instruction and each black circle represents a transmission destination of information or an instruction. A number assigned to each piece of processing indicates which of reading start instructions in steps S310 and S316 the processing is based on.

Figure 4:
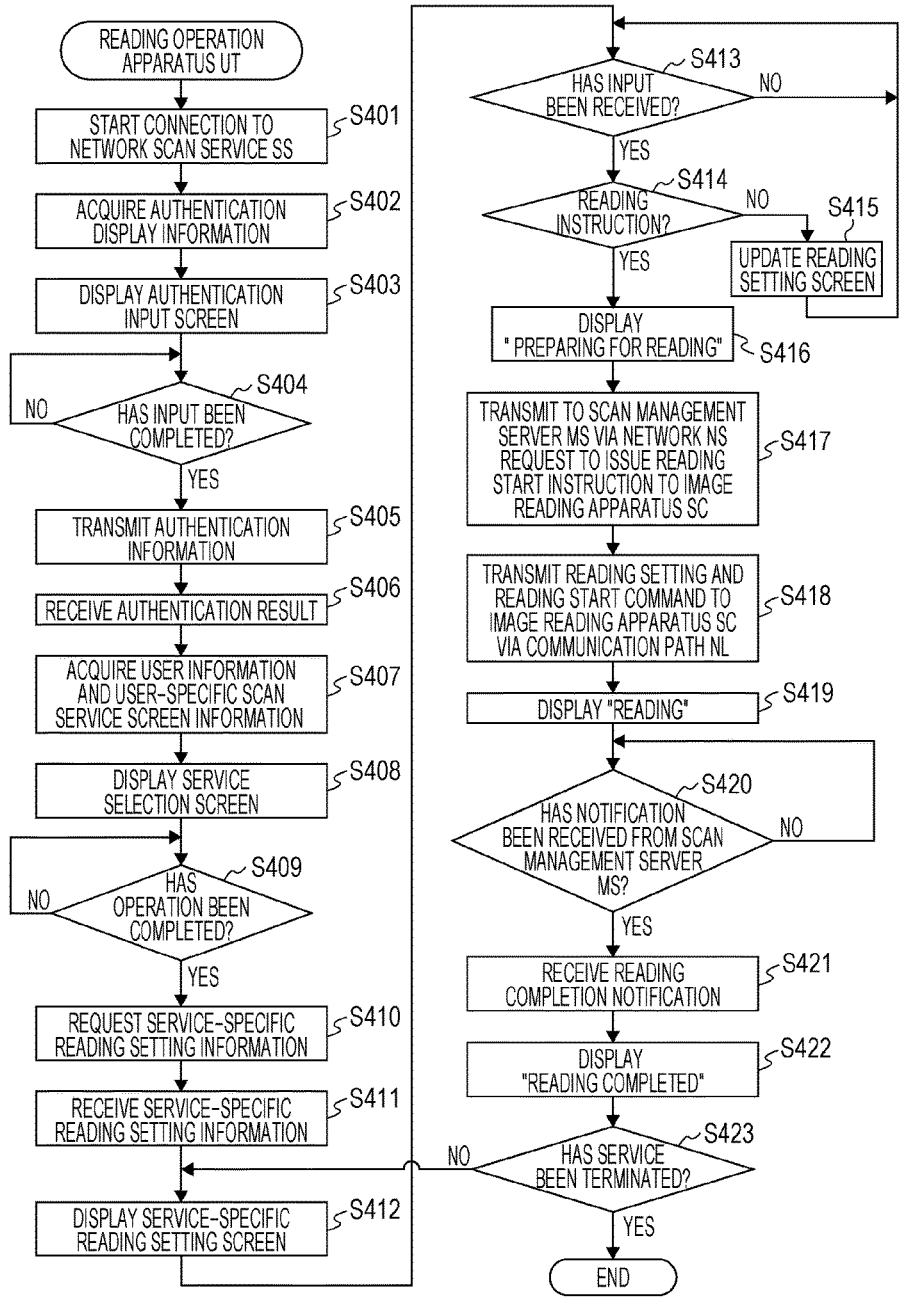
FIG. 4 is a flowchart illustrating the operations of a reading operation apparatus according to the first embodiment.
Figure 5A:
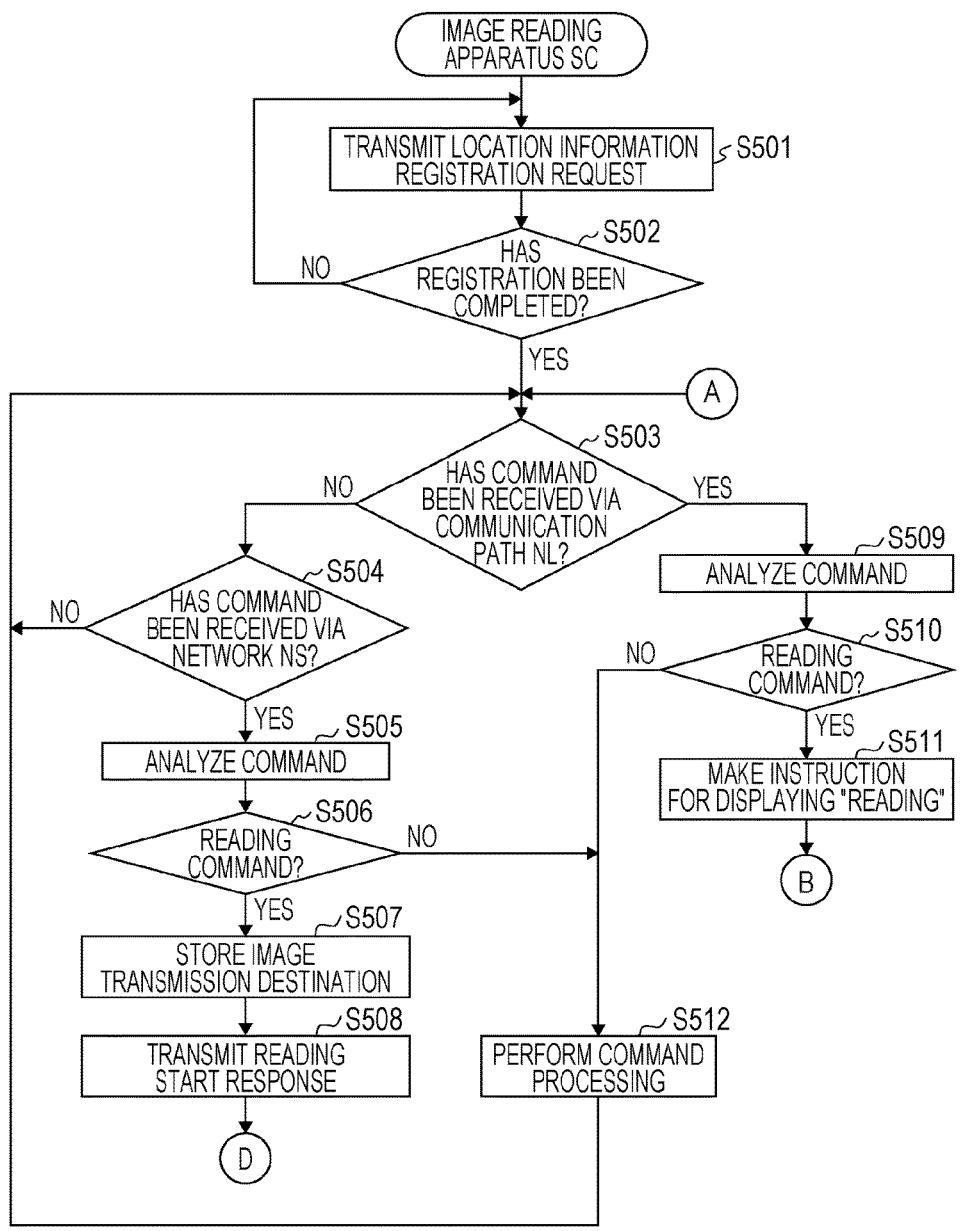
FIGS. 5A to 5D are flowcharts illustrating the operations of an image reading apparatus according to the first embodiment.
Figure 5B:
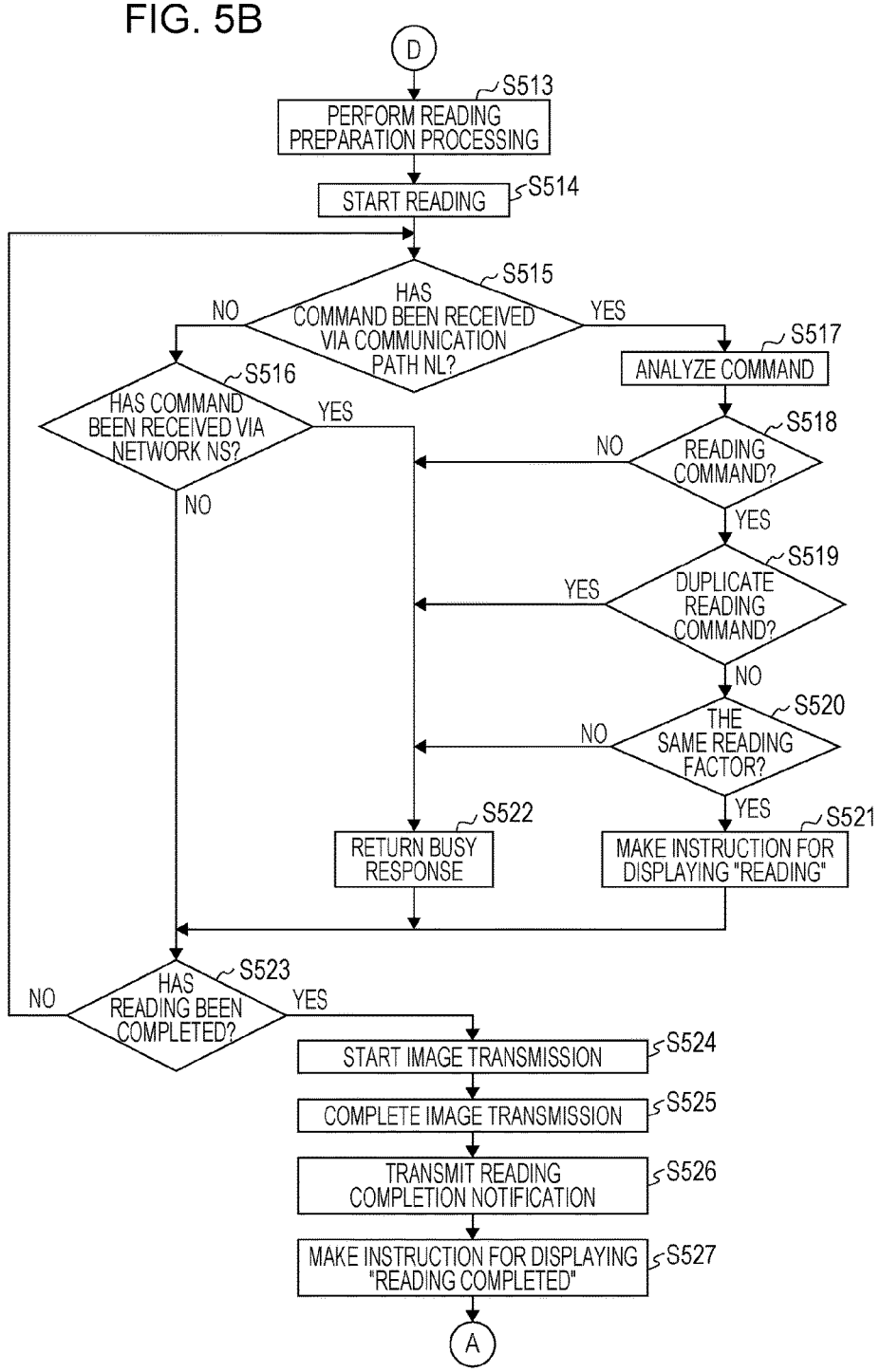
Figure 5C:
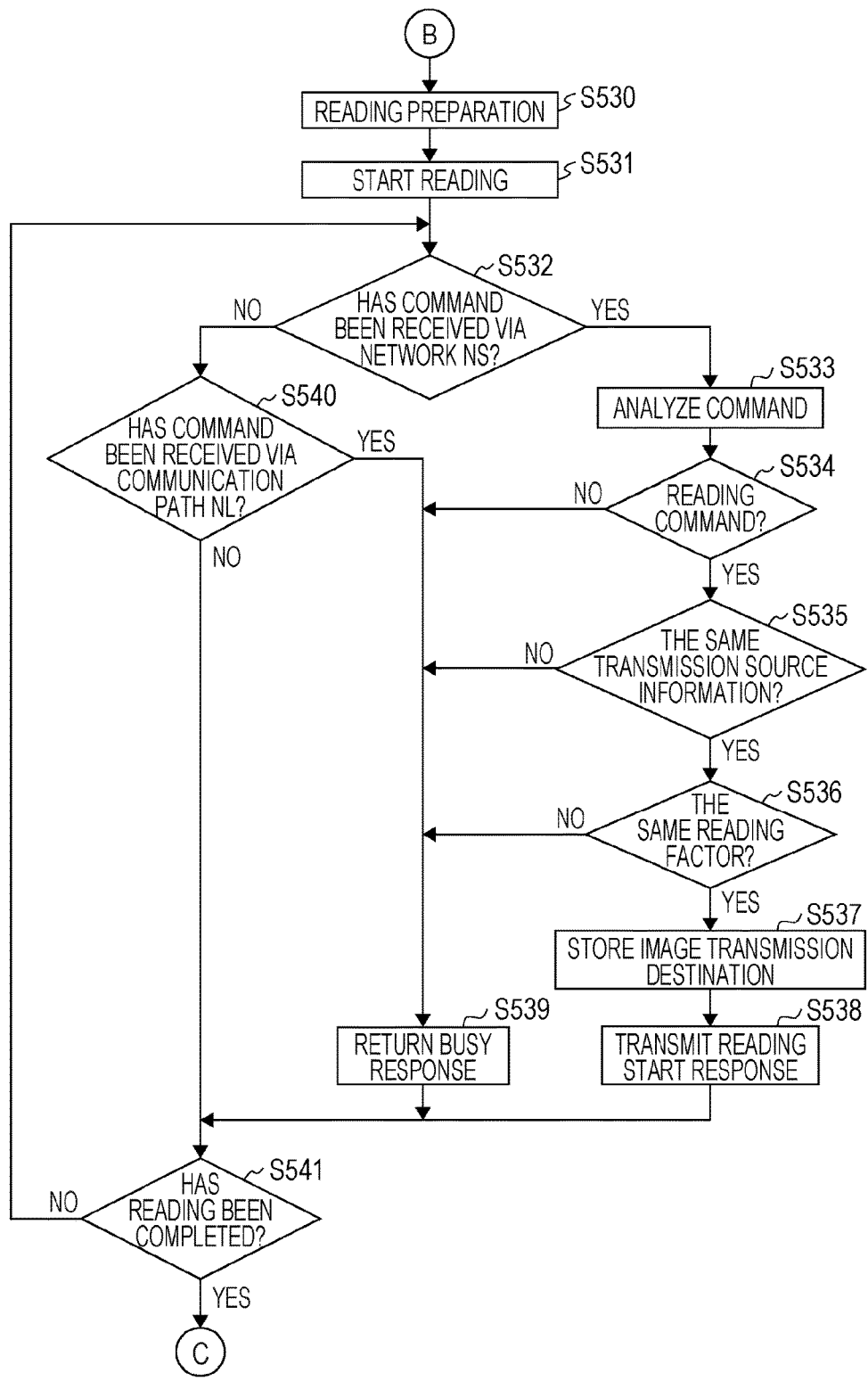
Figure 5D:
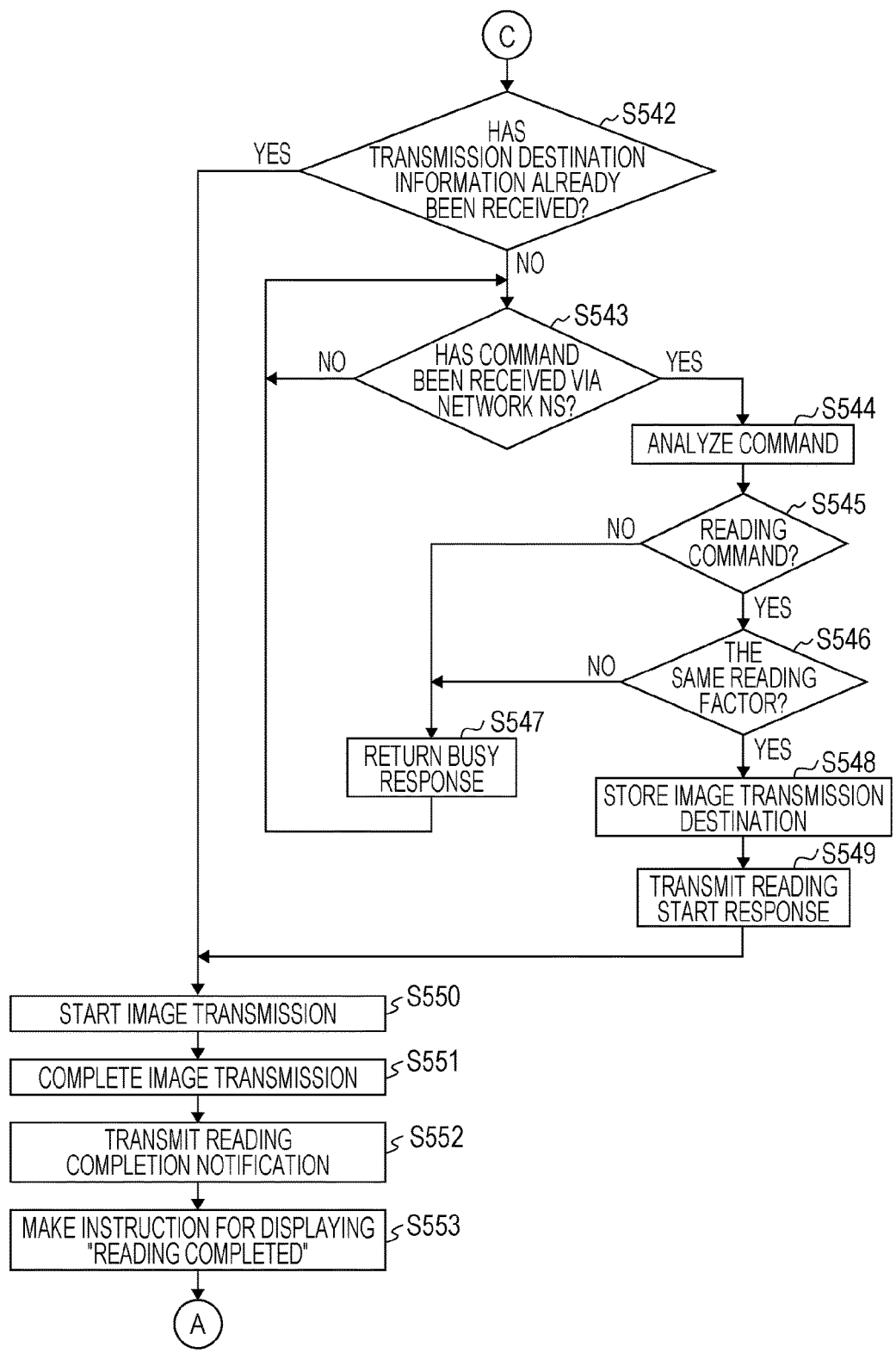
Figure 6A:
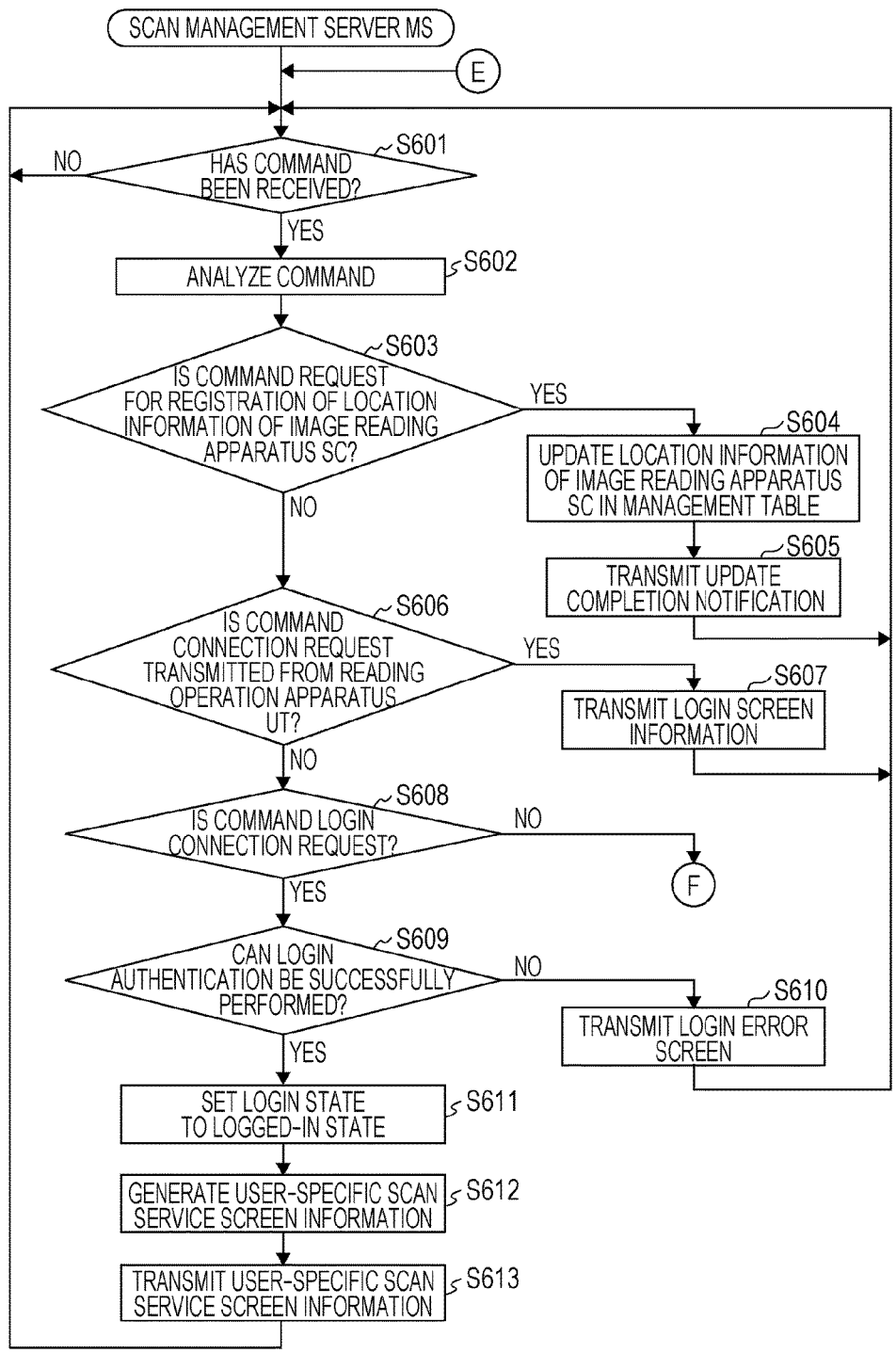
FIGS. 6A and 6B are flowcharts illustrating the operations of a scan management server apparatus according to the first embodiment.
Figure 6B:
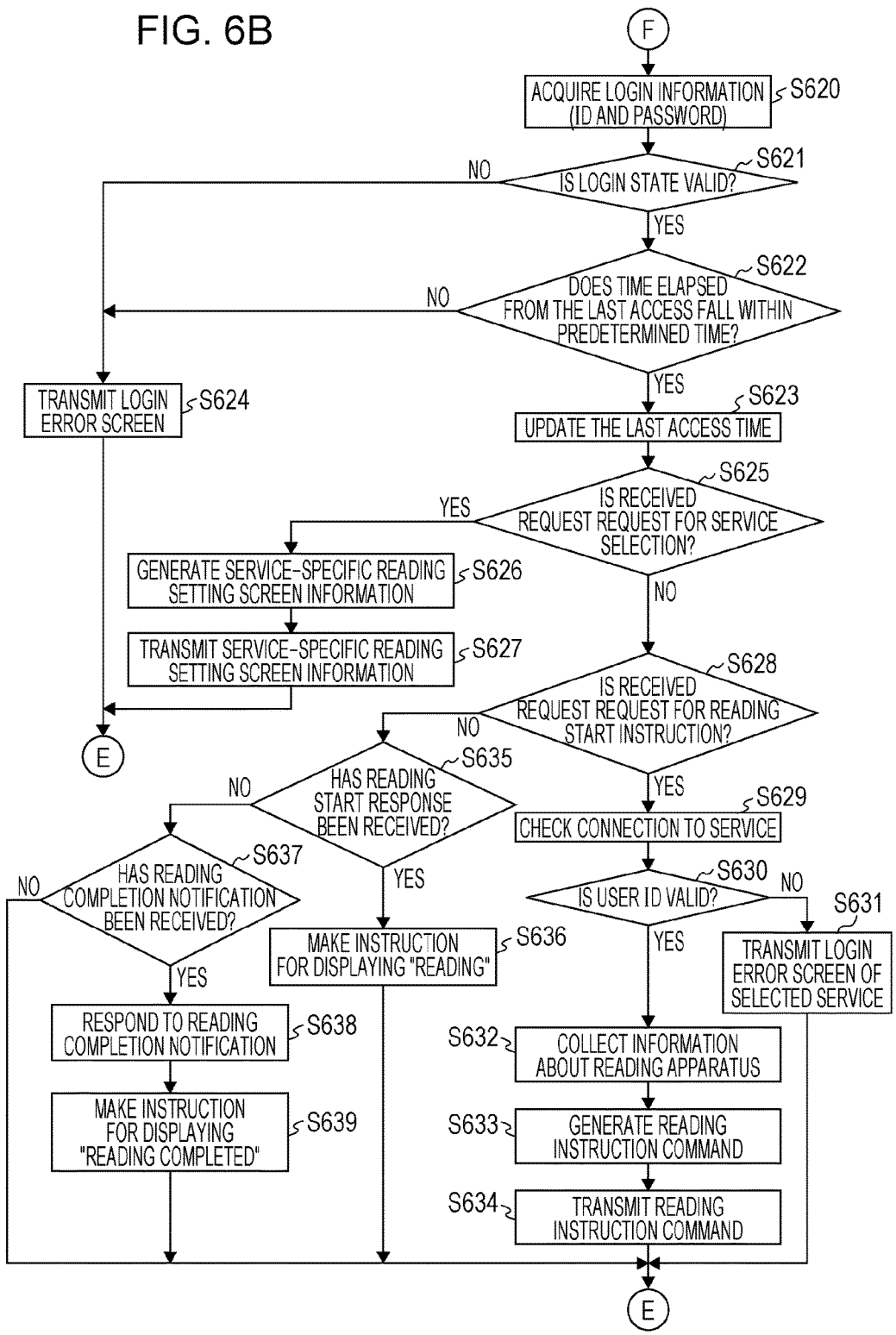

FIGS. 4 to 6 are flowcharts illustrating the operations of the reading operation apparatus UT, the image reading apparatus SC, and the scan management server MS in the image information processing network system N, respectively. The operation illustrated in FIG. 4 is performed in such a manner that the CPU 205 in the reading operation apparatus UT loads a program stored in the ROM 207 into the RAM 206. The operation illustrated in FIG. 5 is performed in such a manner that the CPU 255 in the image reading apparatus SC loads a program stored in the ROM 257 into the RAM 256. The operation illustrated in FIG. 6 is performed in such a manner that a CPU (not illustrated)

in the scan management server MS loads a program stored in a ROM into a RAM. FIGS. 8A to 8F are diagrams illustrating examples of screen information transmitted from a scan management server apparatus to a reading operation apparatus.

Before the reading of an image to the network application service AS, information about network application service used by a user and the image reading apparatus SC which the user uses for document reading are registered in the network scan service SS. This registration information is managed using tables illustrated in FIG. 7 in, for example, a storage unit in the scan management server MS in the network scan service SS or the operation information server apparatus US. A user information management method will be briefly described with reference to FIG. 7.

In this embodiment, the registered user and the registered information about an image reading apparatus are managed using three tables, a registered user management table (table 1), a registered apparatus management table (table 2), and a user-specific registered information management table (table 3).

The registered user management table includes a unique user registration name (user ID), a user password (user PW), and index information (DB Index) used to refer to an information table of each user in a database that stores user-specific registered information. The registered apparatus management table includes unique image reading apparatus information (unique apparatus information) and index information (DB Index) used to refer to an information table of a user registered as the user of the image reading apparatus.

The user-specific registered information management table includes information about an image reading apparatus used by a registered user and network application service account information of the user. The information about an image reading apparatus includes the model of the image reading apparatus (registered apparatus), unique image reading apparatus information for the image reading apparatus (unique apparatus information), information about the location of the image reading apparatus (apparatus location information), a user service login state (login state), and the last usage time (the last access date and time). The apparatus location information is acquired and stored in a state in which the connection to a network is established. The network application service account information includes the number of registered network application services (registered service number), the registered type of each service, the registered ID of the service, and the registered password (PW) of the service.

When a user makes a connection request and inputs data so as to start to use the network scan service SS, the entry of the user is added to these tables. The addition of a user entry can be performed with a known method.

After the above-described registration of a user, document image data is transmitted to network application service by a user operation. This operation will be described in detail below.

Step-1: Registration of Location Information from Image Reading Apparatus SC

When the image reading apparatus SC is started and is connected to the network NS, the image reading apparatus SC transmits unique apparatus information (for example, a MAC address) and information about the location of the image reading apparatus SC in the network NS to the scan management server MS (step S301 in FIG. 3 and step S501 in FIG. 5A). The scan management server MS detects that a command has been received (step S601) and analyzes the command (step S602 in FIG. 6). When the command is a request for the registration of location information of the image reading apparatus SC (step S603 in FIG. 6), the scan management server MS refers to the table 2 in FIG. 7 and updates the location information of the image reading apparatus SC registered in the user-specific table (step S604 in FIG. 6). Subsequently, the scan management server MS transmits a notification of registration completion to the image reading apparatus SC (step S302 in FIG. 3 and step S605 in FIG. 6).

Upon receiving the notification of registration completion, the image reading apparatus SC determines that the registration has been completed (Yes in step S502). The process proceeds to step S503.

Step-2: Start of User Reading Operation

When a user operates the reading operation apparatus UT and selects a function of reading document image data to network application service, a reading operation is started (step S303 in FIG. 3 and step S401 in FIG. 4). The reading operation apparatus UT is connected to the scan management server MS (step S304 in FIG. 3 and step S402 in FIG. 4). More specifically, the first communication unit 208 and the scan management server MS are connected via the network, so that the communication between them can be performed. Upon receiving a connection request from the reading operation apparatus UT, the scan management server MS detects that a command has been received (step S601) and analyzes the command (step S602 in FIG. 6). The scan management server MS determines that the command is not a request for the registration of location information of the image reading apparatus SC (No in step S603 in FIG. 6) but the connection request transmitted from the reading operation apparatus UT (Yes in step S606 in FIG. 6). The scan management server MS transmits screen information for login authentication to the reading operation apparatus UT (steps S305 and S607).

The reading operation apparatus UT displays a login authentication screen (FIG. 8A) and waits for an input (step S403 in FIG. 4). When login authentication information is input into the reading operation apparatus UT (Yes in step S404 in FIG. 4), the reading operation apparatus UT transmits the login authentication information to the scan management server MS (step S306 in FIG. 3 and step S405 in FIG. 4). Upon receiving the login authentication information, the scan management server MS detects that a command has been received (step S601) and analyzes the command (step S602 in FIG. 6). The scan management server MS determines that the command is not a request for the registration of location information of the image reading apparatus SC (No in step S603 in FIG. 6), is not a connection request transmitted from the reading operation apparatus UT (No in step S606 in FIG. 6), and is a login connection request (Yes in step S608 in FIG. 6). The scan management server MS refers to the registered user information database (table 1 in FIG. 7) and determines whether login authentication can be successfully performed (step S609). When login authentication is successfully performed, the login state of the user is set to a logged-in state and the last usage time is updated (step S611 in FIG. 6 and table 3 in FIG. 7). Subsequently, the scan management server MS refers to the number of registered services and the details of the registered services (table 3 in FIG. 7), generates user-specific scan service screen information (step S612 in FIG. 6), and transmits the scan service screen information and a result of the login authentication to the reading operation apparatus UT (step S307 in FIG. 3 and step S613).

The reading operation apparatus UT receives the login authentication result, the user information, and the user-specific scan service screen information (steps S406 and S407 in FIG. 4). The reading operation apparatus UT displays a network application service selection screen (FIG. 8B) based on the received user registration status (step S408) and waits for a user operation (step S409). The user can control the image reading apparatus SC by operating the network application service selection screen on the operation display unit 202. When the user selects one of network application services (when the reading operation apparatus UT receives an instruction from the user) (Yes in step S409), the reading operation apparatus UT transmits a request for display screen information about reading setting in the selected service to the scan management server MS (step S309 in FIG. 3 and step S410 in FIG. 4).

Upon receiving the request for display screen information about reading setting, the scan management server MS detects that a command has been received (step S601) and analyzes the command (step S602 in FIG. 6). The scan management server MS determines that the command is not a request for the registration of location information of the image reading apparatus SC (No in step S603 in FIG. 6), is not a connection request transmitted from the reading operation apparatus UT (No in step S606 in FIG. 6), and is not a login connection request (No in step S608 in FIG. 6). The scan management server MS determines whether the login state is valid (step S620) and a time elapsed from the last access exceeds a predetermined time (step S622). The process proceeds to step S625. When the scan management server MS determines that the received command is the request for display screen information about service-specific reading setting (Yes in step S625), the scan management server MS generates reading setting screen information for the scan service (step S626) and transmits the reading setting screen information to the reading operation apparatus UT (step S627).

Figure 8A:
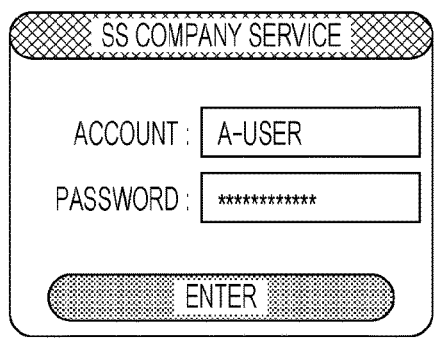
FIGS. 8A to 8F are diagrams illustrating examples of screen information transmitted from a scan management server apparatus according to the first embodiment to a reading operation apparatus according to the first embodiment.
Figure 8B:
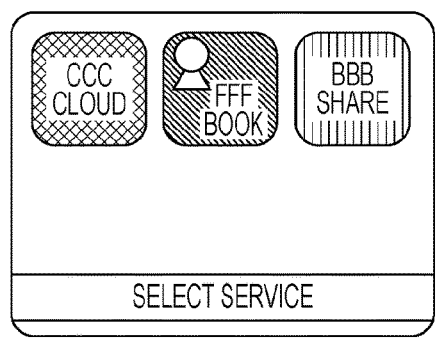
Figure 8C:
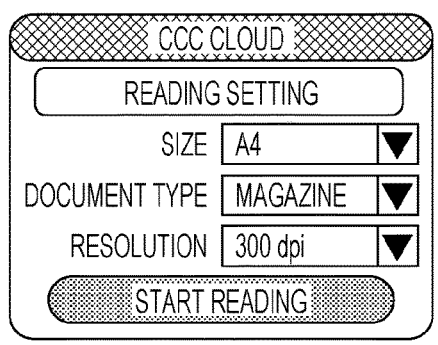
Figure 8D:
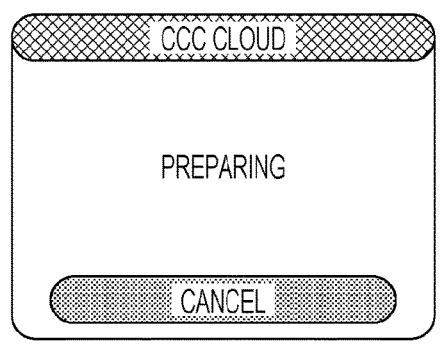
Figure 8E:
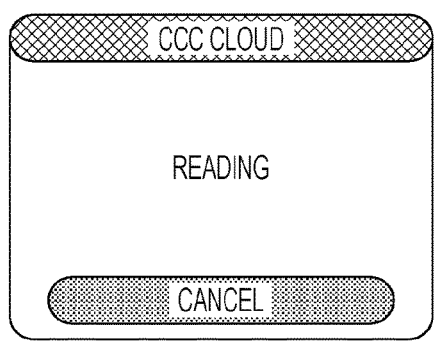
Figure 8F:
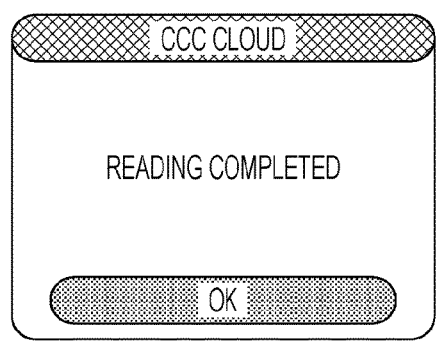

Upon receiving the reading setting screen information (step S411), the reading operation apparatus UT displays a reading setting screen illustrated in FIG. 8C (step S412) and waits for a user input (step S413). When a user input is received (Yes in step S413), the process proceeds to step S414. When reading setting is changed (No in step S414), the updated reading setting is stored and the screen is updated (step S415). For example, when a Scan button is pressed and a reading start instruction is made by the reading operation apparatus UT (Yes in step S414), a message displayed by the reading operation apparatus UT is changed to "preparing for reading" (step S416 and FIG. 8D). The message of "preparing for reading" (FIG. 8D) and a message of "reading" (FIG. 8E) are included in the user-specific service screen information received from the scan management server MS (step S307). Subsequently, the reading operation apparatus UT issues a reading start request via two paths.

Step-3: Issuance of Reading Start Request to Scan Management Server MS Via Network NS The reading operation apparatus UT transmits a user ID in the network scan service SS, network application service selected by a user, and document reading setting to the scan management server MS via the network NS. In addition, the reading operation apparatus UT transmits to the scan management server MS via the network NS a request to issue a reading start instruction to the image reading apparatus SC (step S309 in FIG. 3 and step S417 in FIG. 4). At that time, the reading start instruction issuance request includes, for example, the MAC address of the reading operation apparatus UT, an unique apparatus identification number, and the issuance number of a reading operation instruction.

Step-4: Issuance of Reading Start Request to Image Reading Apparatus SC Via Communication Path NL The reading operation apparatus UT transmits document reading setting to the image reading apparatus SC not via the network NS but via the communication path NL. In addition, the reading operation apparatus UT transmits a reading start command to the image reading apparatus SC via the communication path NL (step S310 in FIG. 3 and step S418 in FIG. 4). This reading start command instructs the image reading apparatus SC to start a document reading operation on the basis of reading setting, generate image data of the document, and temporarily store the generated image data in a storage unit included in the image reading apparatus SC. This reading start command includes the same information (the identification number of the reading operation apparatus UT and the issuance number of a reading operation instruction) as the reading start instruction issuance request in STEP-3 or information apparently associated with such information.

Step-5: Transmission of Reading Start Instruction from Scan Management Server MS to Image Reading Apparatus SC Upon receiving from the reading operation apparatus UT via the network NS the reading conditions and a request to issue a reading start instruction to the image reading apparatus SC (step S309), the scan management server MS checks the state of login to the network scan service SS (step S621 in FIG. 6) and an access idle time (step S622). More specifically, the scan management server MS determines whether the login state is valid (step S621 in FIG. 6) and whether a time elapsed from the last access falls within a predetermined time (step S622 in FIG. 6). When there is no problem about the login state (Yes in step S622), the scan management server MS updates the last access time (step S623). When the received request is not a request for service selection (No in step S625), the scan management server MS determines whether the received request is a request for a reading start instruction (step S628). The scan management server MS checks the connection to network application service selected by a user with the reading operation apparatus UT (step S312 in FIG. 3 and step S629 in FIG. 6). More specifically, the scan management server MS refers to the registered user management table (table 1 in FIG. 7), checks the validity of the reading instruction request transmitted from the reading operation apparatus UT, and then searches the user-specific registered information management table (table 3 in FIG. 7). On the basis of the result of user selection of network application service transmitted from the reading operation apparatus UT in step S309, test connection is performed using network application service connection information of the user. When the login state is no valid (No in step S621) or a time elapsed from the last access exceeds the predetermined time (No in step S622), the scan management server MS transmits a login error screen to the reading operation apparatus UT (step S624).

Upon receiving a connection response from the network application service AS (step S313 in FIG. 3 and step S630 in FIG. 6), the scan management server MS determines that the user ID is valid (Yes in step S630) and collects information about a reading apparatus (step S632). The scan management server MS generates a reading instruction command (step S315 in FIG. 3 and step S633 in FIG. 6).

More specifically, the scan management server MS refers to the user-specific registered information management table (table 3 in FIG. 7) and acquires location information as information about the reading apparatus. The acquisition of the location information is performed for the connection to the image reading apparatus SC specific to the user via the network NS. On the basis of the reading setting received from the reading operation apparatus UT, the scan management server MS generates a reading instruction command (steps S315 and S633). This command includes the same information (the identification number of the reading operation apparatus UT and the issuance number of a reading operation instruction) as the reading start instruction issuance request in STEP-3 or information apparently associated with such information. The scan management server MS transmits the reading start command to the image reading apparatus SC via the network NS (steps S316 and S634). The reading start instruction transmitted in step S316 includes reading setting and information with which an image transmission destination is designated (information about a server to which an image is to be transmitted in this embodiment).

When the connection to the network application service AS is not established, that is, there is no response from the network application service AS, the scan management server MS notifies the reading operation apparatus UT of the occurrence of a connection error (step S631).

Step-6: Start of Reading Operation of Image Reading Apparatus SC

The image reading apparatus SC starts a reading operation in response to either the reading start command transmitted from the reading operation apparatus UT via the communication path NL or the reading start command transmitted from the scan management server MS via the network NS, whichever arrives first (step S314). The image reading apparatus SC often receives the reading start command transmitted via the communication path NL first because the delay in the network NS is greater than that on the communication path NL and processing in the scan management server MS which has been described in STEP-5 takes a time. An operation in this case will be described in STEP-6A. On the other hand, in STEP-6B, an operation performed in a case where the arrival of a reading start command transmitted via the communication path NL has been delayed, that is, the reading start command transmitted from the scan management server MS via the network NS has arrived first will be described.

Step-6A: Start of Reading Operation of Image Reading Apparatus SC in Response to Command Transmitted Via Communication Path NL Upon receiving a reading start command from the reading operation apparatus UT via the communication path NL (step S310 in FIG. 3 and Yes in step S503), the image reading apparatus SC analyzes the command (step S509) and determines that the command is the reading start command (Yes in step S510). The process proceeds to step S511. The image reading apparatus SC transmits a notification that a reading operation has started and an instruction for displaying the message of "reading" to the reading operation apparatus UT (step S311 in FIG. 3 and step S511).

Upon receiving the notification that a reading operation has started, the reading operation apparatus UT displays the message of "reading" (FIG. 8E) which has already been received in STEP-2 (step S419).

The image reading apparatus SC performs reading preparations such as the illumination of a light source, the adjustment of a reading brightness, and the correction of uniformity of sensitivities of lightning and an optical sensor (step S530) and starts to read a document image (steps S314 and S531). The data of the read document image is temporarily stored in an image storage unit in the image reading apparatus SC.

Even during the document reading operation, the image reading apparatus SC checks the receipt of a command transmitted via the network NS (step S532) and the receipt of a command transmitted via the communication path NL (step S540). When a command transmitted via the communication path NL is received (No in step S532 and Yes in step S540), the image reading apparatus SC returns a BUSY response because the reading operation is being performed in response to the command transmitted via the communication path NL (step S539). When a command transmitted via the network NS is received (Yes in step S532), the image reading apparatus SC analyzes the command (step S533). When the received command is a reading start command (Yes in step S534), the image reading apparatus SC checks additional information included in the command against additional information included in the reading start command transmitted via the communication path NL (step S535). The additional information includes the identification number of a registered apparatus that is a transmission source and the issuance number of an operation instruction. When the same transmission source information is included in them, that is, the same identification number of the reading operation apparatus UT is included in them (Yes in step S535) and the same issuance number of an operation instruction is included in them (Yes in step S536), the image reading apparatus SC determines that the reading start command transmitted via the network NS is related to the image data acquired in response to the reading start command transmitted via the communication path NL (step S317). That is, in step S317, it is determined whether the reading start instruction in step S310 and the reading start instruction in step S316 are based on the same operation.

Information about a transmission destination of read image data is included in the command transmitted from the scan management server MS via the network NS. The reading apparatus SC stores the image transmission destination information (step S537) and returns a response saying that the reading operation has started to the scan management server MS (step S538 in FIG. 5 and step S318 in FIG. 3).

Upon receiving the response saying that the reading operation has started from the image reading apparatus SC, the scan management server MS instructs the reading operation apparatus UT to display the message of "reading" (step S319). However, since the reading operation apparatus UT has already displayed the message in response to the command transmitted via the communication path NL (step S311), this instruction is skipped.

When the reading has been completed (Yes in step S541 and step S320), the image reading apparatus SC determines whether the image acquired in response to the reading start instruction in step S310 is transmitted to the destination included in the reading start instruction in step S316 (step S321). More specifically, the image reading apparatus SC determines whether transmission destination information has already been received (step S542 in FIG. 5). When the transmission destination information has already been received (Yes in step S542 and step S321), the image reading apparatus SC refers to the transmission destination information, which has been stored after the receipt of the transmission destination information, and starts to transmit the image data that is a result of the reading operation to the server ES1 in the network application service AS1 (steps S550 and S322).

Upon receiving the image data, the server ES1 in the network application service AS1 transmits a receipt completion notification to the image reading apparatus SC (step S323).

When the image reading apparatus SC has completed image transmission (step S551) and receives the receipt completion notification (step S323) from the server ES1, the image reading apparatus SC transmits a reading completion notification to the scan management server MS (step S324 in FIG. 3 and step S552).

Upon receiving the reading completion notification (Yes in step S637), the scan management server MS returns a response saying that the reading completion notification has been received to the image reading apparatus SC (step S325 in FIG. 3 and step S638 in FIG. 6) and instructs the reading operation apparatus UT to display a message of "reading completed" (FIG. 8F) (steps S327 and S639).

Upon receiving a notification from the scan management server MS (Yes in step S420), the reading operation apparatus UT receives the reading completion notification (step S421). Upon receiving the reading completion display instruction, the reading operation apparatus UT displays the message of "reading completed" on the operation display unit 202 (step S422). The process is repeated until the service is terminated (the process returns to step S412 in the case of No in step S423). When the service is terminated (Yes in step S423), the process ends.

The instruction for displaying the message of "reading completed" is also transmitted from the image reading apparatus SC (steps S326 and S553). The instruction received later is skipped.

When the image reading apparatus SC has not received transmission designation information at the time of completion of reading (No in step S542), the image reading apparatus SC waits for a reading start command including the transmission designation information which is transmitted from the scan management server MS via the network NS (steps S543, S544, S545, and S547). More specifically, when the image reading apparatus SC receives a command transmitted via the network NS, the mage reading apparatus SC analyzes the command (step S544). When the received command is not a reading start command (No in step S545), the image reading apparatus SC returns a BUSY response (step S547). The process returns to step S543. On the other hand, when a command transmitted from the scan management server MS via the network NS is the reading start command (Yes in step S545) and the identification number of the reading operation apparatus UT and the issuance number of a reading operation instruction included in the command are the same as the above-described identification number and the above-described issuance number, respectively (Yes in step S546), the image reading apparatus SC stores image transmission destination information included in the command (step S548). Subsequently, the image reading apparatus SC returns a reading start response to the scan management server MS (step S549).

In the above-described operations, even when the reading start command including transmission destination information is received during reading (step S537), the transmission of image data is started (step S550) after the reading operation has been completed (step S541). When transmission destination information is received from the scan management server MS during reading, pieces of image data stored in the storage unit in the image reading apparatus SC may be sequentially transmitted. In this case, the transmission of image data to network application service can be more effectively performed.

Step-6B: Start of Reading Operation of Image Reading Apparatus SC in Response to Command Transmitted Via Network NS Upon receiving a reading start command from the reading operation apparatus UT via the network NS (step S316 and Yes in step S504), the image reading apparatus SC analyzes the command (step S505) and determines that the command is a reading command (Yes in step S506). The process proceeds to step S507. In step S507, the image reading apparatus SC stores image data transmission destination information included in the received command and returns a reading start response to the scan management server MS (steps S508 and S318). At the time of the storage of the transmission destination information in step S507, the identification number of the reading operation apparatus UT that has transmitted the reading start command issuance instruction to the scan management server MS and the issuance number of the reading operation instruction.

Upon receiving the reading start response, the scan management server MS issues an instruction for displaying the message of "reading" (step S319) as a response to the reading start command issuance instruction (step S309) transmitted from the reading operation apparatus UT.

Upon receiving the reading start command, the image reading apparatus SC performs reading preparation processing (step S513) and starts to read a document image (steps S314 and S514). The read image data is temporarily stored in the storage unit in the image reading apparatus SC. When a command transmitted via the network NS is received before the completion of reading (No in step S515 and Yes in step S516), the image reading apparatus SC returns a BUSY response (step S522). When a command transmitted via the communication path NL is received before the completion of reading (Yes in step S515), the image reading apparatus SC analyzes the command (step S517). When the received command is not a reading command (No in step S518), the image reading apparatus SC returns a BUSY response (step S522). When the received command is a reading command (Yes in step S518), is not a duplicate reading command (No in step S519), and the reading factor of the received command is the same as that of the reading start command transmitted via the network NS (steps S310 and S520), the image reading apparatus SC returns an instruction for displaying the message of "reading" (steps S311 and S521). The same reading factor means that, for example, these commands are transmitted from the same reading operation apparatus UT and the issuance numbers of reading operation instructions are the same. After the completion of reading of the document image (Yes in step S523), the image reading apparatus SC refers to the stored transmission destination information and starts to transmit the image data to the server ES1 in the network application service AS1 (steps S524 and S322).

Upon receiving the image data red by the image reading apparatus SC, the server ES1 in the network application service AS1 transmits a receipt completion notification to the image reading apparatus SC (step S323).

When the image reading apparatus SC completes image transmission (step S525) and receives the receipt completion notification from the server ES1 (step S323), the image reading apparatus SC transmits a reading completion notification to the scan management server MS (step S324 in FIG. 3 and step S526 in FIG. 5).

Upon receiving the reading completion notification (step S324), the scan management server MS notifies the image reading apparatus SC of the receipt of the reading completion notification (step S325 in FIG. 3 and step S638 in FIG.

6) and instructs the reading operation apparatus UT to display a message of "reading completed" (FIG. 8F) (steps S327 and S639). When the image reading apparatus SC has already received a valid reading start command from the reading operation apparatus UT via the communication path NL, the image reading apparatus SC transmits a reading completion notification to the reading operation apparatus UT (steps S326 and S527).

In the above-described operations, after the completion of a reading operation (step S523), the transmission of image data is started (step S524). However, at the same time as the reading operation, image data may be transmitted to network application service.

As described previously in detail, the reading operation apparatus UT transmits to the scan management server MS via the network NS a command to issue a reading operation instruction to the image reading apparatus SC. At the same time as the issuance of the command, the reading operation apparatus UT also transmits a reading operation start command to the image reading apparatus SC via the communication path NL. In this embodiment, the transmission of the instruction issuance command via the network NS and the transmission of the reading operation start command via the communication path NL are performed at the same time. However, an embodiment of the present invention is not limited to this case.

When the image reading apparatus SC receives the reading operation start command via the communication path NL, the image reading apparatus SC can start the reading of a document and the storage of image data irrespective of a delay that occurs in the transmission of a command via the network NS and a processing time taken in the scan management server MS. As a result, a period from the start of user operation of the reading operation apparatus UT to the completion of transmission of document image data can be shortened and the convenience of a user can be enhanced. Even when an unexpected delay occurs in the communication path NL between the reading operation apparatus UT and the image reading apparatus SC, a reading operation and the transmission of image data to a server can be performed in response to a reading operation start command received via the network NS. Thus, a stable system operation can be achieved. It should be note that, when the reading operation start command transmitted via the network NS has been received earlier than the reading operation start command transmitted via the communication path NL, document reading can be started in response to the reading operation start command transmitted via the network NS. That is, in this embodiment, document reading can be started in response to either a reading operation start command transmitted via the network NS or a reading operation start command transmitted via the communication path NL, whichever arrives first.

Even in a case where the control of a reading operation is performed via an operation information server apparatus, a time lag between an user operation and the operation of an image reading apparatus can be reduced. In addition, a user can quickly recognize the execution of a job in an image reading apparatus through cloud service.

The communication path NL may be an inter-device communication unit compliant with a near field communication standard such as Bluetooth (registered trademark) or the ad hoc mode in IEEE 802.11 (Wi-Fi). Alternatively, the communication path NL may be a dedicated communication unit between the reading operation apparatus UT and the image reading apparatus SC.

Second Embodiment

An image information processing network system N according to the second embodiment will be described with reference to FIGS. 9 and 10. FIG. 9 is a diagram illustrating the configuration of the image information processing network system N according to the second embodiment. In this embodiment, instead of the image reading apparatus SC, a Multi Functional Peripheral/Printer (MFP) transmits document image data. Referring to the drawing, the same reference numerals are used to identify parts already described in the first embodiment, and the description thereof will be therefore omitted.

An MFP 900 illustrated in FIG. 9 includes an operation display unit 901, an operation input unit 902, an operation unit 903, a communication unit (IF) 904, an image reading unit (SC) 905, an printing unit 906, and a control unit (CTR) 907.

The operation display unit 901 displays a display screen on which a printer state stored in a storage unit (not illustrated) is displayed, a display screen on which operational choices are displayed, and operation screen information acquired from an external apparatus via the communication unit. The operation input unit 902 receives a user operation input. The operation unit 903 associates operation input information input via the operation input unit 902 with operation information displayed on the operation display unit 901 and converts the operation input information into a user operation input information. The communication unit 904 communicates with an external apparatus on the basis of the user operation input information. The control unit 907 controls the autonomic function such as a copy function of the MFP. The image reading unit 905 can perform a reading operation in response to a command transmitted from an external apparatus and received by the communication unit 904. The printing unit 906 prints received print data in response to a command transmitted from an external apparatus and received by the communication unit 904. Under the control of the control unit 907, the image reading unit 905 and the printing unit 906 perform an MFP functional operation such as hard-copy documentation in coordination with each other. The operation state display unit 908 displays the operation state of the MFP 900, and may include a lamp, a display device, or both of them. In this embodiment, the operation state display unit 908 keeps a light in a standby state in which the MFP 900 is left turned on and periodically flashes the light during a functional operation such as a document reading operation, a print operation, or a copy operation so as to display a state in which job processing is being performed.

Although not illustrated, the control unit 907 performs various pieces of control computation processing and includes a central processing unit (CPU) for performing overall control of a reading operation apparatus UT, a Read-Only Memory (ROM) that stores a control process, and a Random Access Memory (RAM) used for control computation processing. The ROM stores various control programs executed by the CPU and fixed data. The RAM is used as a work area where the CPU performs various pieces of computation processing and control processing. Various pieces of control processing are performed in such a manner that the CPU loads a program stored in the ROM into the RAM.

The configurations of the network scan service SS, the network application service AS1, and the network application service AS2 connected to the MFP 900 via the network NS are the same as those described in the first embodiment, and the descriptions thereof will be omitted. Like in the first embodiment, information about a registered user and information about an image reading apparatus are managed using three tables. At that time, as a registration apparatus, an MFP is managed.

Figure 10B:
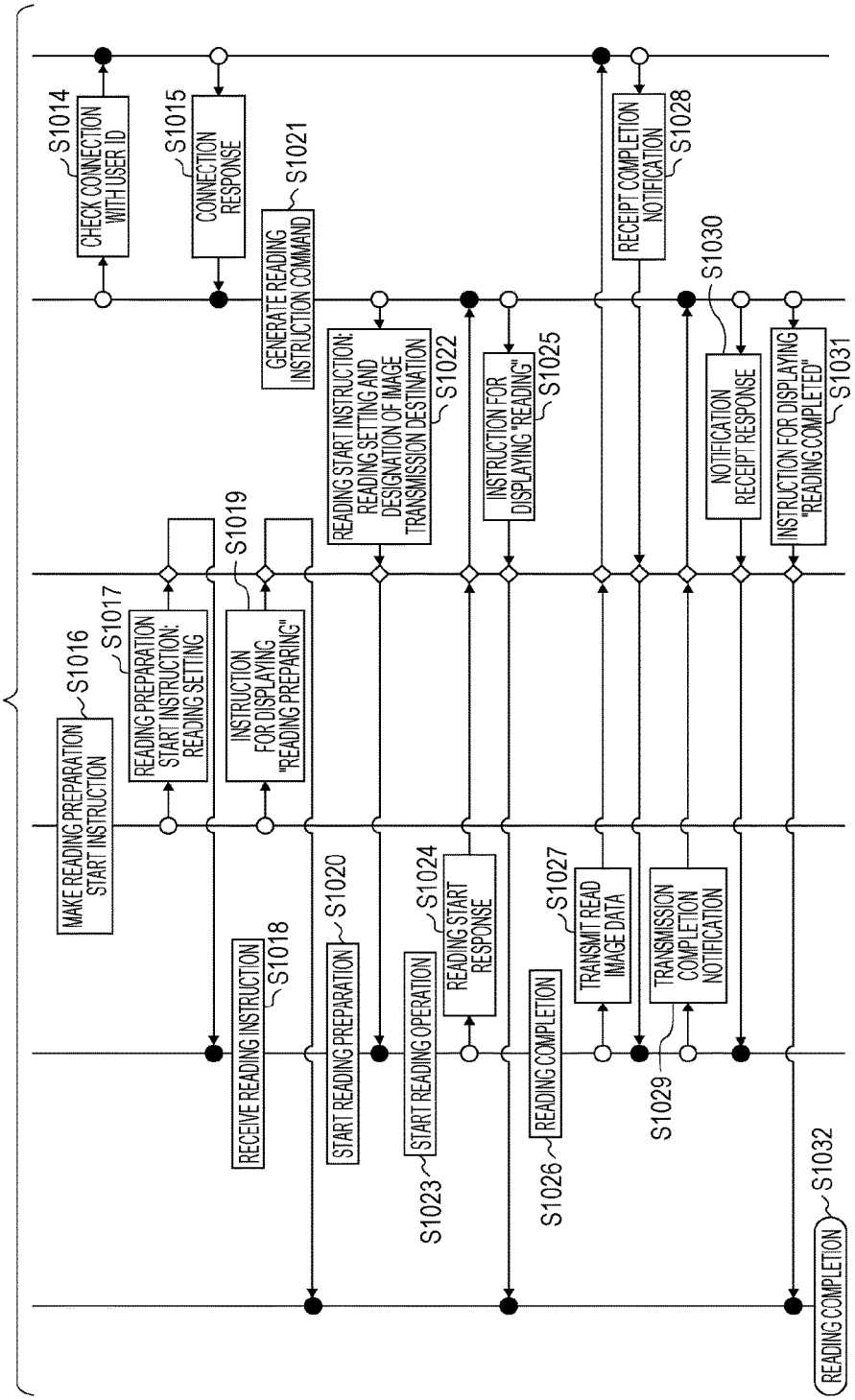

FIG. 10 is a sequence diagram describing an image reading operation in the image information processing network system including the MFP 900. The scan management server MS generates a reading instruction in accordance with an operation input performed with the reading operation unit UT. In response to the reading instruction, the image reading unit SC reads a document and transmits acquired document image data to the network application service. This process will be described with reference to FIG. 10. In this embodiment, a function achieved by a collaboration of the operation display unit 901, the operation input unit 902, and the operation unit 903 is called the reading operation unit UT. In the sequence diagram illustrated in FIG. 10, each white circle represents a transmission source of information or an instruction, each black circle represents a transmission destination of information or an instruction, and each diamond indicates that information or an instruction is relayed without being changed.

Like in the first embodiment, after a user has been registered as the user of the network scan service SS, document image data is transmitted to network application service by the operation of the user. This process will be described in detail below.

Step-1: Registration of Location Information from Image Reading Unit SC

When the MFP 900 is started and the communication unit IF is connected to the network NS, the image reading unit SC transmits unique apparatus information (for example, the MAC address of the communication unit IF in the MFP 900) and information about the location of the image reading unit SC in the network NS to the scan management server MS via the communication unit IF (step S1001). When the scan management server MS determines that a location information registration request has been received from the MFP 900, the scan management server MS updates the location information of the MFP 900 and transmits a notification of registration completion to the MFP 900 (step S1002).

Step-2: Start of User Reading Operation

When a user operates the reading operation unit UT and selects a function of reading document image data to network application service, a reading operation is started (step S1003).

The reading operation unit UT is connected to the scan management server MS (step S1004).

Upon receiving a connection request from the reading operation unit UT, the scan management server MS transmits screen information for login authentication to the reading operation unit UT (step S1005).

Upon receiving the screen information for login authentication, the reading operation unit UT displays the login authentication screen (FIG. 8A) and waits for an input. When login authentication information is input into the reading operation unit UT, the reading operation unit UT transmits the login authentication information to the scan management server MS (step S1006).

Upon receiving the login authentication information, the scan management server MS refers to the registered user information database and determines whether login authentication can be successfully performed. When login authentication is successfully performed, the scan management server MS generates scan service screen information for the user and transmits the scan service screen information and a result of the login authentication to the reading operation unit UT (step S1007).

In the reading operation unit UT, when network application service is selected, reading setting is performed, and a reading start instruction is made (step S1008), the reading operation unit UT issues a reading start request to the communication unit IF (step S1009).

Step-3: Issuance of Reading Start Request to Scan Management Server MS and Start of Preparation Operation The reading operation unit UT transmits a request for the issuance of a reading instruction including a user ID in the network scan service SS, network application service selected by a user, and document reading setting to the scan management server MS via the communication unit IF. More specifically, when the communication unit IF detects that the request issued by the reading operation unit UT is a reading instruction issuance request for the scan management server MS (step S1010), the communication unit IF transmits the reading instruction issuance request to the scan management server MS (step S1011). The communication unit IF transmits to the control unit CTR via a communication path in the MFP 900 reading setting information and a notification that the reading instruction issuance request have been detected (step S1012). The transmission of the request to the scan management server MS and the transmission of the notification to the control unit CTR may be performed at the same time, or one of them may be performed immediately before the other one of them.

The control unit CTR generates a command simulating a reading preparation start command transmitted to the image reading unit SC from an external apparatus on the basis of the reading setting information (step S1016) and transmits the generated command to the image reading unit SC via the communication unit IF (step S1017).

Upon receiving the reading preparation start command, the image reading unit SC starts a reading function job, changes the operation state display unit 908 from a constantly lighting state to a flashing state, displays the start of a job in the MFP 900, and starts to receive a reading instruction (step S1018).

Subsequently, in response to the reading preparation start command, the image reading unit SC starts reading preparations such as the adjustment of reading density and an feeding operation in an automatic document feeder (ADF) which take a time (step S1020). The control unit CTR transmits an instruction for displaying the message of "reading preparing" to the reading operation unit UT via the communication unit IF (step S1019).

Step-4: Transmission of Reading Start Instruction from Scan Management Server MS to Image Reading Unit SC Upon receiving reading conditions and a request for the issuance of a reading start instruction to the image reading unit SC from the communication unit IF in the MFP 900 via the network NS (step S1011), the scan management server MS checks whether a user ID is registered in service SS (step S1013). When the user ID is registered, the scan management server MS checks the connection to network application service selected by the user with the reading operation unit UT (step S1014).

Upon receiving a user ID connection check, the network application service AS transmits a connection response to the scan management server MS (step S1015).

Upon receiving the connection response from the network application service AS, the scan management server MS acquires location information required for the connection to the image reading unit SC via the network NS. On the basis of the reading setting received from the reading operation unit UT, the scan management server MS generates a reading start command (step S1021). The scan management server MS transmits the reading start command to the image reading unit SC in the MFP 900 via the network NS (step S1022).

The communication unit IF in the MFP 900 relays the reading start command (step S1022) to the image reading unit SC.

Step-5: Start of Reading Operation of Image Reading Unit SC

Upon receiving the reading start command from the scan management server MS via the network NS and the communication unit IF, the image reading unit SC starts a reading operation after the completion of the reading preparation (step S1023). The image reading unit SC stores image data transmission destination information included in the reading start command and returns a reading start response to the scan management server MS (step S1024).

Upon receiving the reading start response, the scan management server MS issues an instruction for displaying the message of "reading" as a reply to the reading start response (step S1024) transmitted from the image reading unit SC in the MFP 900 (step S1025).

Upon receiving the instruction for displaying the message of "reading", the reading operation unit UT in the MFP 900 displays the message of "reading".

After completing the reading of a document image (step S1026), the image reading unit SC refers to the stored transmission destination information and starts to transmit image data to the server ES1 in the network application service AS1 (step S1027).

Upon receiving the image data, the server ES1 in the network application service AS1 transmits a receipt completion notification to the image reading unit SC (step S1028).

Upon receiving the receipt completion notification (step S1028) from the server ES1, the mage reading unit SC transmits a reading completion notification to the scan management server MS (step S1029).

Upon receiving the reading completion notification, the scan management server MS returns a notification receipt response to the image reading unit SC (step S1030) and transmits an instruction for displaying the message of "reading completed" to the reading operation unit UT (step S1031).

In this embodiment, after the completion of a reading operation (step S1026), the transmission of image data is started (step S1027). However, at the same time as the reading of a document image, image data may be transmitted to network application service.

In this embodiment, the reading operation unit UT and the image reading unit SC are disposed in the same cabinet and are connected to the network NS via the common communication unit IF. The control unit CTR in the MFP 900 detects that a request for the issuance of an instruction for causing the image reading unit SC to perform a reading operation has been transmitted from the reading operation unit UT to the scan management server MS, generates a reading preparation start command, and transmits the reading preparation start command to the image reading unit SC.

In this embodiment, the request for the issuance of an instruction for causing the image reading unit SC to perform a reading operation is transmitted from the reading operation unit UT to the scan management server MS via the network NS. At the same time as the issuance of the instruction, reading preparations such as the adjustment of reading density and an feeding operation in an ADF which take a time are started in response to a command generated in the MFP 900. As a result, a period from the receipt of the reading start command via the network NS and the start of reading can be shortened. The issuance of the command to the scan management server MS and the start of the reading preparations are performed at the same time in this embodiment, but one of them may be performed immediately before the other one of them.

According to this embodiment, the period from a user operation to the start of operation of an apparatus can be shortened. The operation for storing read image data in an image storage unit is not necessary. An embodiment of the present invention can be applied to a product with a small resource such as a RAM memory. That is, an operational response delay can be reduced while suppressing the increase in a hardware resource. When a user operates the image reading unit SC using an operation unit included in the same cabinet as the image reading unit SC, the user can easily recognize that an operation has started late. In this embodiment, a response time from a user operation until the start of operation of an apparatus can be reduced and usability can be improved for an operator.

In this embodiment, the communication unit IF and the control unit CTR process a reading preparation start command transmitted via a communication path in the MFP 900. The reading operation unit UT therefore does not need to recognize that reading operation commands are issued via two paths. Accordingly, the same processing as an operation UI processing for another operation terminal TT can be performed in the reading operation unit UT. That is, according to this embodiment, in the built-in reading operation unit UT and the general-purpose operation terminal TT, a common operation procedure can be easily created.

A basic configuration according to an embodiment of the present invention is not limited to the above-described configuration. An image processing apparatus connected to cloud service is not limited to an image reading apparatus or an MFP, and can be applied to, for example, a system for transmitting a command for the issuance of an instruction for forming an image with document data or image data stored in the cloud service from the operation unit UT via the network NS. Examples of an image processing apparatus for receiving an image formation instruction issuance command include an image forming apparatus in a thermal ink jet system and an electrophotographic image forming apparatus. For example, in an image forming apparatus in a thermal ink jet system, as a preparation for a print operation of a print unit, the calibration and recovering operation of an apparatus are needed. In some electrophotographic image forming apparatuses, as a preparation operation, the acquisition of remaining heat in a fixing device is needed. In both of these cases, the operation unit UT issues a command to cloud service and a preparation operation in a print unit is started in response to a command generated in an MFP at the same time. As a result, a time from the receipt of a print start command via the network NS until the start of print of an image on a recording medium can be shortened.

In the above-described embodiments, image reading processing has been described. However, an embodiment of the present invention is not limited to image reading processing and, for example, print processing may be performed.

In the above-described embodiments, a period from a time at which a user makes a processing start instruction to a time at which a processing apparatus starts to operate can be shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-136333, filed Jul. 1, 2014 which is hereby incorporated by reference herein in its entirety.

What is claimed is:

1. A system comprising an image processing device and an information processing device,
the information processing device comprising at least one processor and at least one memory storing computer executable instruction that, when executed by the at least one processor of the information processing device, causes the information processing device to: a processing unit configured to perform processing
accept a user instruction for causing the image processing device to perform image reading processing;
transmit, to a server via a first communication path, a request with first additional information including reading setting information and first identification information, so as to issue a first execution instruction for causing the image processing device to perform the image reading processing, in response to the user instruction; and
issue, to the image processing device via a second communication path different from the first communication path, a second execution instruction, with second additional information including reading setting information and second identification information, for causing the image processing device to perform the image reading processing, in response to the user instruction,
the image processing device comprising at least one processor and at least one memory storing computer executable instruction that, when executed by the at least one processor of the image processing device, causes the image processing device to:
receive the first execution instruction with the first additional information and image transmission destination information, that the server has issued via the first communication path;
receive the second execution instruction with the second additional information, that the information processing device has issued via the second communication path;
generate digital image data by performing image reading processing; and
transmit the generated digital image data, and
wherein, in a case where the first execution instruction is received before the second execution instruction, the image reading processing is performed in response to the first execution instruction and the generated digital image data is transmitted based on the image transmission destination information, and
wherein, in a case where the second execution instruction is received before the first execution instruction, the image reading processing is performed in response to the second execution instruction and the generated digital image data is transmitted based on the image transmission destination information if the first identification information and the second identification information are associated with each other.

2. The system according to claim 1 wherein the first execution instruction and the second execution instruction are start instructions for causing the image processing device to perform the image reading processing.

3. The system according to claim 1,
wherein the image processing device is an image reading device which performs image reading processing, and
wherein the first execution instruction and the second execution instruction are image reading instructions.

4. The system according to claim 3, wherein the at least one processor of the image processing device further executes an instruction for causing the image processing device to transmit a notification regarding start of the image reading processing, in response to receipt of the second execution instruction, and
wherein the at least one processor of the information processing device further executes an instruction for causing the information processing device to display information about execution of the image reading processing in response to receipt of the notification.

5. The system according to claim 1,
wherein the second execution instruction is a start instruction of processing preparation for the image processing device, and
wherein the first execution instruction is a start instruction of image reading processing for the image processing device.

6. The system according to claim 1, wherein the user instruction is accepted on a display screen displayed on the basis of operation information provided from the server.

7. The system according to claim 1, wherein the at least one processor of the information processing device further executes an instruction for causing the information processing device to display an operation state of the image processing device and change the operation state of the image processing device on the basis of the second execution instruction.

8. The system according to claim 1,
wherein the at least one processor of the image processing device further executes an instruction for causing the image processing device to determine whether the received first identification information and the
received second identification information are associated with each other, and
wherein the image processing is performed if it is determined that the first identification information and the second identification information are associated with each other.

9. The system according to claim 1, further comprising the server and a second server,
a first server configured to,
wherein the second server receives the generated digital image data.

10. The system according to claim 1,
wherein an image processing apparatus includes the image processing device, and
wherein an information processing apparatus different from the image processing apparatus includes the information processing device.

11. The system according to claim 1, wherein an image processing apparatus includes the image processing device and the information processing device.

12. An apparatus comprising an image processing device communicating with an information processing device e,
the image processing device comprising at least one processor and at least one memory storing computer executable instruction that, when executed by the at least one processor of the image processing device, causes the image processing device to,
receive a first execution instruction with first additional information and image transmission destination information, that a server has issued based on a request transmitted from the information processing device, via a first communication path;
receive a second execution instruction with second additional information, that the information processing device has issued via a second communication path different from the first communication pass;
generate digital image data by performing image reading processing; and
transmit the generated digital image data,
wherein, in a case where the second execution instruction is received before the first execution instruction, the image reading processing is performed in response to the second execution instruction and the generated digital image data is transmitted based on the image transmission destination information if the first identification information and the second identification information are associated with each other.

13. The apparatus to claim 12, further comprising:
the information processing device comprising at least one processor and at least one memory storing computer executable instruction that, when executed by the at least one processor of the information processing device, causes the information processing device to
accept a user instruction for causing the image processing device to perform image reading processing;
transmit, to a server via the first communication path, the request with the first additional information including reading setting information and the first identification information, so as to issue the first execution instruction for causing the image processing device to perform the image reading processing, in response to the user instruction; and
issue, to the image processing device via the second communication path, the second execution instruction with second additional information including reading setting information and the second identification information for causing the image processing device to perform the image reading processing, in response to the user instruction.

14. A processing method of an information processing system including an image processing device and an information processing device, the method comprising:
accepting a user instruction for causing the image processing device to perform image reading processing;
transmitting to a server via a first communication path, a request with first additional information including reading setting information and first identification information, so as to issue a first execution instruction for causing the image processing device to perform the image reading processing, in response to the user instruction; and
issuing, to the image processing device via a second communication path different from the first communication path, a second execution instruction, with second additional information including reading setting information and second identification information, for causing the image processing device to perform the image reading processing, in response to the user instruction;
receiving the first execution instruction with the first additional information and image transmission destination information, that the server has issued via the first communication path;
receiving the second execution instruction with the second additional information, that the information processing device has issued via the second communication path;
generating digital image data by performing image reading processing;
causing, in a case where the first execution instruction is received before the second execution instruction, the image reading processing is performed in response to the first execution instruction and the generated digital image data is transmitted based on the image transmission destination information, and
causing, in a case where the second execution instruction is received before the first execution instruction, the image reading processing is performed in response to the second execution instruction and the generated digital image data is transmitted based on the image transmission destination information if the first identification information and the second identification information are associated with each other; and
transmitting a processing result of the image reading processing.

15. A non-transitory computer-readable recording medium storing a program for causing a computer to perform a control method of a system including an image processing device and an information processing device, the control method comprising the steps of:
accepting a user instruction for causing the image processing device to perform image reading processing;
transmitting to a server via a first communication path, a request with first additional information including reading setting information and first identification information, so as to issue a first execution instruction for causing the image processing device to perform the image reading processing, in response to the user instruction; and
issuing, to the image processing device via a second communication path different from the first communication path, a second execution instruction, with second additional information including reading setting information and second identification information, for causing the image processing device to perform the image reading processing, in response to the user instruction;

receiving the first execution instruction with the first additional information and image transmission destination information, that the server has issued via the first communication path;

receiving the second execution instruction with the second additional information, that the information processing device has issued via the second communication path;

generating digital image data by performing image reading processing;

causing, in a case where the first execution instruction is received before the second execution instruction, the image reading processing is performed in response to the first execution instruction and the generated digital image data is transmitted based on the image transmission destination information, and causing, in a case where the second execution instruction is received before the first execution instruction, the image reading processing is performed in response to the second execution instruction and the generated digital image data is transmitted based on the image transmission destination information if the first identification information and the second identification information are associated with each other; and transmitting a processing result of the image reading processing.

16. A non-transitory computer-readable recording medium storing a program for causing a computer to perform a method comprising:

generating digital image data by performing image reading processing;

receiving a first execution instruction with first additional information and image transmission destination information, that a server has issued based on a request transmitted from the information processing device, via a first communication path;

receiving a second execution instruction with second additional information, that the information processing device has issued via a second communication path different from the first communication pass; and transmitting the generated digital image data, wherein in a case where the first execution instruction is received before the second execution instruction, the image reading processing is performed in response to the first execution instruction and the generated digital image data is transmitted based on the image transmission destination information, and wherein, in a case where the second execution instruction is received before the first execution instruction, the image reading processing is performed in response to the second execution instruction and the generated digital image data is transmitted based on the image transmission destination information if the first identification information and the second identification information are associated with each other.

* * * * *